US008660710B2

(12) United States Patent
Tanaka

(10) Patent No.: US 8,660,710 B2
(45) Date of Patent: Feb. 25, 2014

(54) RADIO CONTROL TRANSMITTER, A METHOD FOR TRANSMITTING STEERING SIGNAL IN THE RADIO CONTROL TRANSMITTER

(75) Inventor: Masahiro Tanaka, Chouseigun (JP)

(73) Assignee: Futaba Corporation (JP)

( * ) Notice: Subject to any disclaimer, the term of this patent is extended or adjusted under 35 U.S.C. 154(b) by 337 days.

(21) Appl. No.: 12/879,403

(22) Filed: Sep. 10, 2010

(65) Prior Publication Data

US 2011/0077801 A1 Mar. 31, 2011

(30) Foreign Application Priority Data

Sep. 29, 2009 (JP) ................................. 2009-224612

(51) Int. Cl.
- G05D 1/00 (2006.01)
- G05D 3/00 (2006.01)
- G06F 7/00 (2006.01)
- G06F 17/00 (2006.01)

(52) U.S. Cl.
USPC ............... 701/2; 244/189; 244/190; 244/229; 434/30

(58) Field of Classification Search
USPC ................... 701/2; 434/29, 30, 35, 239, 243; 244/189, 190, 196, 197, 229
See application file for complete search history.

(56) References Cited

U.S. PATENT DOCUMENTS

| 4,760,392 | A   | * | 7/1988  | Yamamoto et al. ............ 340/9.1 |
| 5,638,053 | A   |   | 6/1997  | Schuman |
| 6,247,994 | B1  | * | 6/2001  | DeAngelis et al. ........... 446/454 |
| 7,831,351 | B1  | * | 11/2010 | Hofer et al. ...................... 701/36 |
| 2009/0289828 | A1 | * | 11/2009 | Hinchey ........................ 341/176 |

FOREIGN PATENT DOCUMENTS

| DE | 3342575 A1 | 6/1985 |
| JP | 07-031751  | 2/1995 |

OTHER PUBLICATIONS

German Patent Office, Official Action, Serial No. 10 2010 037 818.6, Oct. 11, 2012.
Puetter, et al., Bericht zur Eroeffnung des Freizeitpark Vulkan mit robbe Modellsportland, Sep. 29, 2009, 14 pages (English translation of relevant parts only).
Robbe/Futaba T8FG Neue Referenz in der Mittelklasse, Rotor Dec. 2009, pp. 44-47 (English translation of relevant parts only).
Futaba Corporation, 8FG 8 Channel Radio Control System Instruction Manual, Aug. 2009, 124 pages.

* cited by examiner

Primary Examiner — Thomas Tarcza
Assistant Examiner — Kevin Myhre
(74) Attorney, Agent, or Firm — Quarles & Brady LLP

(57) ABSTRACT

The channel assignment data is generated by assigning a channel of the radio control transmitter for the trainee 1B associated with the same controlled object to a channel of the radio control transmitter for the trainer 1A, and stored in the radio control transmitter for the trainer 1A. The radio control transmitter for the trainer 1A converts the channel of the received trainer signal into the steering signal according to the channel assignment data, and transmits the steering signal.

4 Claims, 14 Drawing Sheets

FIG. 2

| CHANNEL No. | FUNCTION |
|---|---|
| CH1 | ELEVATOR |
| CH2 | RUDDER |
| CH3 | THROTTLE |
| CH4 | AILERON |
| CH5 | 2nd AILERON |
| CH6 | FLAP |
| CH7 | GEAR |
| CH8 | RESERVE |

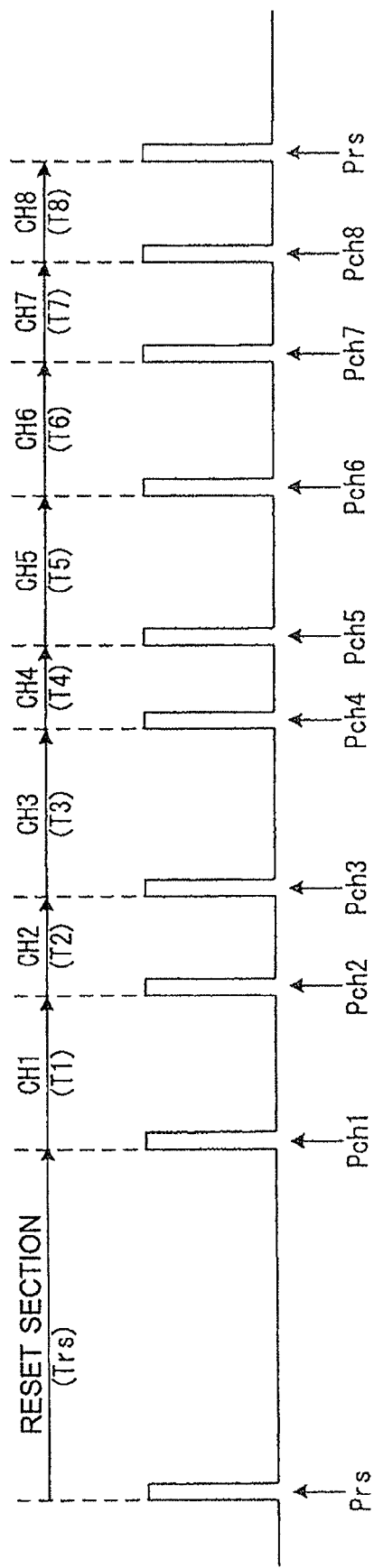

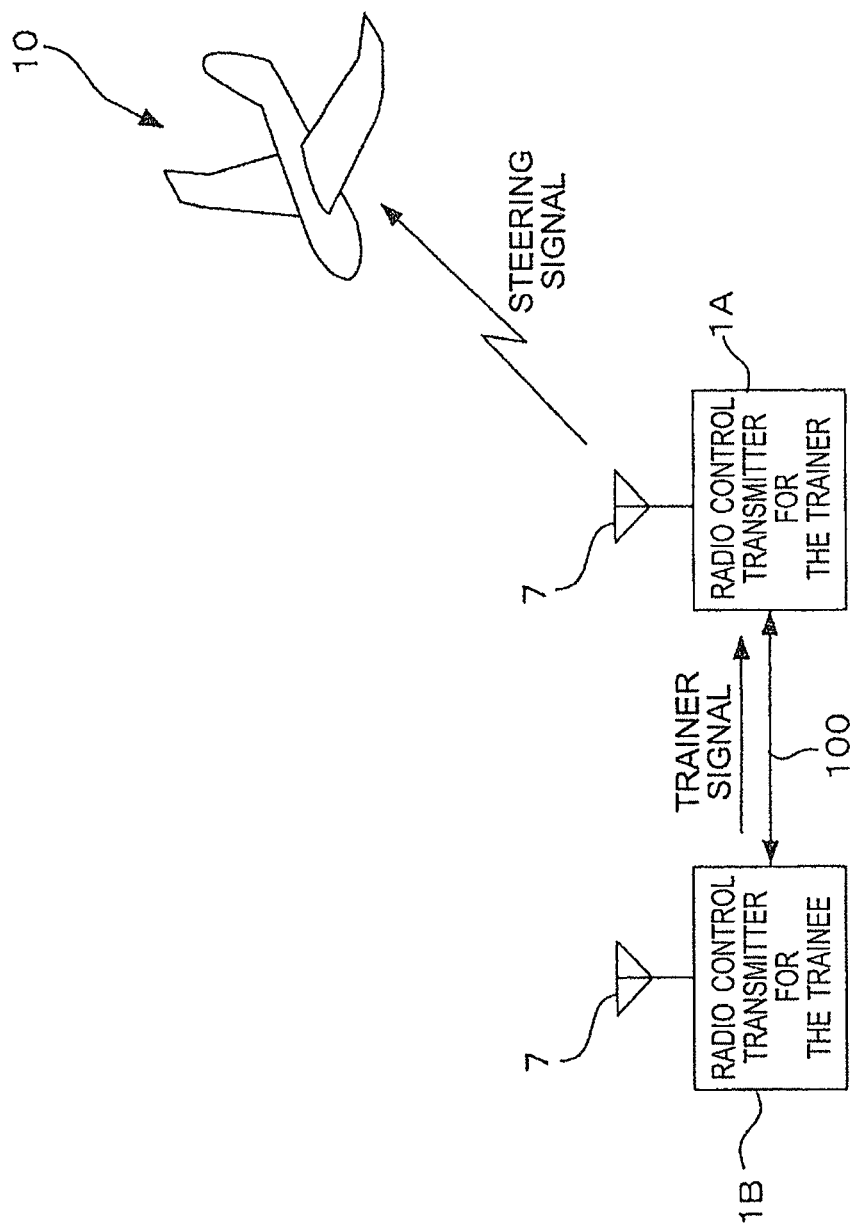

FIRST MODE (NORMAL MODE)

SECOND MODE (FUNCTION MODE)

THIRD MODE (MIX MODE)

FIG. 10

CHANNEL CORRESPONDING TABLE

| TRAINEE SIDE CHANNEL | CONVERTED CHANNEL |
|---|---|
| CH1 | CH4 |
| CH2 | CH1 |
| CH3 | CH3 |
| CH4 | CH2 |
| CH5 | CH7 |
| CH6 | CH6 |
| CH7 | CH5 |
| CH8 | CH8 |

SECOND MODE (FUNCTION MODE)

THIRD MODE (MIX MODE)

RADIO CONTROL TRANSMITTER, A METHOD FOR TRANSMITTING STEERING SIGNAL IN THE RADIO CONTROL TRANSMITTER

BACKGROUND OF THE INVENTION

1. Field of the Invention

The present invention relates to a radio control transmitter for a model plane, and relates to a method for transmitting directly or indirectly a steering signal from the radio control transmitter for steering a steered object.

2. Description of the Related Art

Among the steered objects as radio control models, in particular, a flying object such as an airplane or a helicopter is hard to be controlled, and proficiency is needed for controlling the flying object. Therefore, for allowing a beginner to practice the steering without bringing down the flying object, a radio control transmitter having a trainer function is known.

When using the trainer function, two radio control transmitters are connected to each other with a cable for the trainer function or a wireless communication for allowing the communication for the trainer function.

One of the connected radio control transmitters works as a radio control transmitter for a trainer which is controlled by the trainer, and the other connected radio control transmitter works as a radio control transmitter for a trainee which is controlled by the trainee.

First, when the radio control transmitter for the trainee which is set as a trainer mode is controlled, the radio control transmitter for the trainee sends control data corresponding to a control operation of the trainee to the radio control transmitter for the trainer.

Further, a trainer switch is provided on the radio control transmitter having the trainer function. The radio control transmitter for the trainer can be switched between passive mode and active mode corresponding to the operation of the trainer switch.

On one hand, in the passive mode, the steering data as the trainer signal inputted from the radio control transmitter for the trainee is sent as the steering signal to the steered object from an antenna 7 thereof. Accordingly, in the passive mode, the steered object moves corresponding to a steering operation via the radio control transmitter for the trainee.

On the other hand, in the active mode, the steering data corresponding to the steering operation via the radio control transmitter for the trainer is sent as the steering signal to the steered object. In this case, the steering data corresponding to the trainer signal from the radio control transmitter for the trainee is not sent as the steering signal.

For example, when the trainer makes the trainee practice the steering, the passive mode is selected. Thus, the steering signal corresponding to the steering operation done by the trainee via the radio control transmitter for the trainee is sent to the steered object. Namely, the trainee can steer the steered object.

However, for example, when the trainee steers in the passive mode, suppose that the trainee mistakes the steering operation and the flight condition of the steered object becomes unstable. Alternatively, suppose that there is a situation for doing a highly difficult operation such as a landing operation.

At this time, the trainer switches the trainer switch to switch from the passive mode to the active mode. In this way, even when the trainee operates the radio control transmitter for trainee 1B, the steered object does not respond to the operation. Instead, the steered object only responds to the steering operation via the radio control transmitter for the trainer. Then, in the active mode, for example, the trainer operates so as to stabilize the flight condition, or operates to land the steered object.

In this way, using the trainer function, the trainee can safely practice the steering without bringing down the steered object or without a bad landing.

Further, in the radio control system for a model, one channel is assigned to each individual control object (also called as function). For example, when the steered object is a flying object, aileron, elevator, and the like are typical as the function. One channel is assigned to each of these functions. Such a channel assignment is referred to as a channel order.

The steering signal sent from the radio control transmitter is composed of control amount data obtained by the operation which is assigned to each channel. The radio control transmitter encodes a signal attained corresponding to the operation with respect to an operational element as the control amount data, generates the steering signal by assigning the control amount data to an appropriate channel, and sends the steering data to the steered object (a radio control receiver).

At the steered object side, correspondence relationship between the channels and the control objects such as servo is set according to the established channel order. In this way, at the steered object side, an appropriate control object is driven based on data in each channel of the steering signal received by the radio control receiver. Thus, the steered object is moved according to the operation of a pilot at the radio control transmitter side.

[Patent Document 1] JP, A, H07-31751

Conventionally, it is a condition of the trainer function that the radio control transmitter for trainer and the radio control transmitter for the trainee have the same channel order. Namely, in the trainer function, the number n of CH1 to CHn data in the trainer signal sent from the radio control transmitter for the trainee directly becomes CH1 to CHn data in the steering signal sent from the radio control transmitter for the trainer.

However, in the current condition, the setting of the channel order varies by types of the radio control transmitter. Further, currently, the radio control transmitter of which channel order is voluntarily changed by the user operation becomes known for correspond individually to the steering style of each operator. Accordingly, even if the type of the radio control transmitter is the same, the channel order may be varied by the radio control transmitter.

Suppose that using two radio control transmitters having different channel orders as the radio control transmitters for trainer and for trainee, the trainer function is performed. Normally, the steered object has the channel order corresponding to the radio control transmitter for the trainer. In this case, in the passive mode, the radio control transmitter for the trainer sends the steering signal according to the channel order of the trainer signal from the radio control transmitter for the trainee. Then, for example, the trainee intends to control the aileron, however, other than the aileron of the steered object is moved, and the steered object cannot be controlled according to the trainee's plan.

For avoiding such an inconvenience, for example, if at least one of the radio control transmitters for trainer and for trainee can change the setting of the channel order, one of the channel orders may be changed to be the same as the other channel order. However, in reality, because the channel order change operation is very complicated and troublesome, it is a substantial burden for a user to operate this channel order change operation whenever using the trainer function.

Accordingly, an object of the present invention is to resolve the trouble of the channel order difference between the radio control transmitter for the trainer and the radio control transmitter for the trainee when using the trainer function of such as the radio control system for a model.

SUMMARY OF THE INVENTION

In order to attain the object, according to the present invention, there is provided a radio control transmitter including:

a receiving device configured to receive an indirect steering signal assigned to operational data of an controlled object in each channel according to a channel order which is set, said indirect steering signal being sent by an external radio control transmitter, and said indirect steering signal having the channel order which is set, said channel order associating a channel with a controlled object;

a channel assignment data holding device configured to hold channel assignment data which assigns the channels of a present radio control transmitter to the channels of the external radio control transmitter which are associated with the same controlled objects under the above channel order;

a channel converting device configured to convert the channels of the present radio control transmitter to the channels of the external radio control transmitter corresponding to the operational data in the channel assignment data in each operational data of the received indirect steering signal; and a direct steering signal generating device configured to receive the operational data in which at least the channels of the present radio control transmitter are assigned by the channel converting device, being configured to store the received operational data as data of the channels which are assigned, and being configured to generate a direct steering signal.

According to another aspect of the present invention, there is provided a radio control transmitter including:

a channel association data holding device configured to hold channel association data which indicates an association between channels of a present radio control transmitter and channels of an external radio control transmitter assigned to the same controlled objects under a channel order which is set by associating the channels with the controlled objects;

a channel converting device configured to convert the channels to operational data which is attained by an operation to the controlled objects of the present radio control transmitter, and configured to assign the channels of the external radio control transmitter which indicates an assignment of the channel of the present radio control transmitter in the channel order assigned to the controlled object which is operated by the channel association data;

an indirect steering data generating device configured to generate indirect steering data by assigning the operational data to each channel according to an assignment setting of the channel converting device; and an indirect steering signal transmitting device configured to transmit the indirect steering data to the external radio control transmitter which transmits a direct steering signal to an steered object, said direct steering signal being formed by assigning the operational data to each channel according to an assignment of the operational data to each channel in the inputted indirect steering signal.

EFFECT OF THE INVENTION

According to the above, the present invention allows the direct steering signal converted to the channel order setting of the radio control transmitter for the trainer corresponding to the operation of the radio control transmitter for the trainee to transmit. In this way, even if the channel orders of the radio control transmitters for the trainer and for the trainee are different, the steered object can be appropriately moved according to an operation done by the radio control transmitter for the trainee.

Further, when converting the channel, for example, the channel association data which indicates the association between the channels of the present radio control transmitter and the channels of the external radio control transmitter which are associated with the same controlled objects. In this way, it becomes unnecessary to change the channel order, and an operational burden of a user is drastically reduced.

These and other objects, features, and advantages of the present invention will become more apparent upon reading of the following detailed description along with the accompanied drawings.

BRIEF DESCRIPTION OF THE DRAWINGS

FIG. 2 is a table showing an example of a channel order set in a radio control system;

FIG. 3 is a timing chart showing an example of a steering signal (trainer signal) in PPM signal format;

FIG. 4 is an explanatory view for explaining a general outline of a trainer function;

FIG. 10 is a table showing an example of a channel assignment table generated by the channel assignment;

DETAILED DESCRIPTION OF THE PREFERRED EMBODIMENTS

Figure 1:
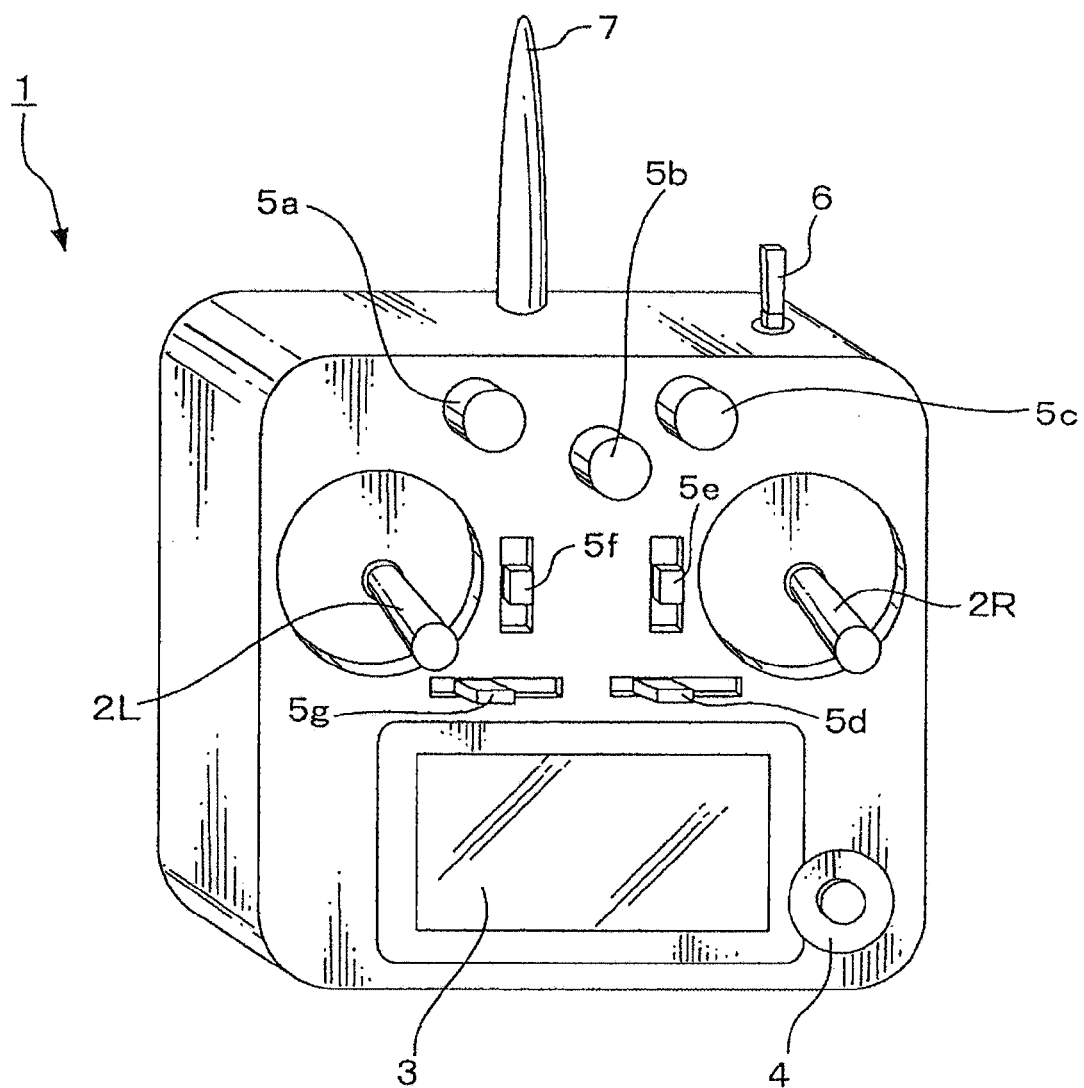
FIG. 1 is a perspective showing an example of an exterior appearance of a radio control transmitter according to an embodiment of the present invention.

Hereinafter an embodiment of the present invention will be sequentially explained with reference to a table of contents.

1. An example of an exterior appearance of a radio control transmitter
2. Regarding a channel order
3. An outline of a trainer function
4. Operative mode of a radio control transmitter for the trainer in the trainer function
5. Problems in a conventional trainer function
6. A channel conversion function according to this embodiment: Outline
7. The channel conversion function according to this embodiment: A first example
 [7-1. System configuration]
 [7-2. Channel assignment operation]
 [7-3. Channel conversion process configuration in a second mode (function mode)]
 [7-4. Channel conversion process configuration in a third mode (mix mode)]
 [7-5. Steering signal process corresponding to the channel conversion process]
8. The channel conversion function according to this embodiment: A second example

1. An Example of an Exterior Appearance of a Radio Control Transmitter

This embodiment of the present invention is applied to a radio control transmitter in a radio control system for a model. The radio control system is composed of a model steered object having the radio control transmitter, a radio control receiver, a servo and the like.

FIG. 1 shows an example of an exterior appearance of the radio control transmitter 1 for a model which can be used as a radio control transmitter for the trainer or for the trainee having the trainer function of this embodiment. The radio control transmitter 1 as shown in FIG. 1 is so-called stick type. A steered object having the radio control receiver and the servo corresponding to the radio control transmitter 1 is a flying object such as model airplane or model helicopter.

As shown in FIG. 1, a left stick lever 2L and a right stick lever 2R are provided on a front panel of the radio control transmitter 1. When an operator operates by tilting the left stick lever 2L and the right stick lever 2R up, down, left, or right, a steering signal having a control amount corresponding to the operation is transmitted from the radio control transmitter 1 to the steered object. In this way, for example, nose-up, nose-down, change of direction, speed of the steered object as the flying object can be controlled. For example, operations of up, down, left, and right of the left stick lever 2L and the right stick lever 2R are assigned to one specific channel.

Further, a display screen 3 is provided below the left stick lever 2L and the right stick lever 2R on the front panel of the radio control transmitter 1. This display screen 3 is, for example, a display for displaying an image in a display device, and displays various setting screens or a control condition when steering the steered object.

Further, an operation on an image displayed on the display screen 3 can be done by a display operational element 4 disposed on the right side of the display screen 3. In this way, various setting operation can be done as well as later-described channel matching operation for matching the channel orders of the radio control transmitters for the trainer and for the trainee. Further, a touch panel may be combined with the display screen 3. The operation on the display image can be done by the touch panel operation.

Further, dial operational elements 5a to 5c, push switches 5d to 5e are also provided on the radio control transmitter 1. Proper parameters or channels can be assigned to these operational elements by, for example, a user setting operation.

An antenna 7 is provided for transmitting the steering signal to be sent to the steered object as a radio wave. When the radio control transmitters for the trainer and for the trainee transmit and receive via a radio channel, this antenna 7 is used for transmitting and receiving the radio wave between the radio control transmitters for the trainer and for the trainee.

2. Regarding a Channel Order

In the radio control system for a model, one channel (CH) is assigned to each individual controlled object (also referred to as a function). This assignment setting of the controlled object with regard to the channel is also referred to as a channel order.

For example, in the radio control transmitter 1 of this embodiment, up to 8 channels can be used. In this case, the radio control transmitter 1 can control, for example, up to 8 servos.

FIG. 2 shows an example of the assignment setting between channel numbers and controlled objects as the channel orders. As shown in FIG. 2, an elevator is assigned to CH1, a rudder is assigned to CH2, a throttle is assigned to CH3, an aileron is assigned to CH4, a second aileron is assigned to CH5, a flap is assigned to CH6, a gear is assigned to CH7, and CH8 is a reserve.

Further, as the steering signal transmitted from the radio control transmitter 1 to the steered object, several methods and formats are known. For example, FIG. 3 shows a PPM (Pulse Position Modulation) signal as the steering signal. Incidentally, this PPM steering signal also corresponds to 8 channels.

In the PPM steering signal, a reset pulse Prs rises up at the beginning of one period. A channel pulse Pch1 corresponding to CH1 rises up after a lapse of specific time Trs which is predetermined as a reset section from the time when the reset pulse rises up. Namely, the next pulse is recognized as the channel pulse Pch1 when the next pulse rises up after a lapse of specific time Trs from one pulse which rises up.

Then, a channel pulse Pch2 corresponding to CH2 rises up after a lapse of specific time T1 next to the channel pulse Pch1. Similarly, after a lapse of specific time T2, T3, T4, T5, T6, T7, channel pulses Pch3, Pch4, Pch5, Pch6, Pch7, Pch8 corresponding to CH3, CH4, CH5, CH6, CH7, CH8 sequentially rise up. Then, after a lapse of specific time T8 from the time when the channel pulse Pch8 rises up, the reset pulse Prs of the next period rises up. Incidentally, depending on the number of channels, one period of the PPM steering signal is about 20 msec.

In this way, in the PPM signal, the time T1 to T8 as pulse intervals are attained in each of channel pulses Pch1 to Pch8. Each of these pulse intervals as the time T1 to T8 indicates a control amount of the function assigned respectively corresponding to CH1 to CH8.

Regarding a relationship between the channel order shown in FIG. 2 and the control amount, for example, when an operator operates to move the elevator with the radio control transmitter 1, a pulse interval of the channel pulse Pch1 corresponding to CH1, namely, the length of the time T1 in the steering signal is set based on the control amount of the operation. Further, for example, when an operator operates the throttle with the radio control transmitter 1, the length of the time T3 as the pulse interval of the channel pulse Pch3 corresponding to CH3 is set corresponding to the control amount of the throttle which is operated.

When the radio control receiver receives the above steering signal, the radio control receiver decodes the time as pulse interval T1 to T8, and calculating the control amounts corresponding to CH1 to CH8. Then, controlled objects assigned respectively to CH1 to CH8 such as servo are driven according to the control amount.

3. An Outline of a Trainer Function

The radio control transmitter 1 of this embodiment shown in FIG. 1 deals with the trainer function, and can work as the radio control transmitter for the trainer or for the trainee.

A basic operation of the trainer function will be explained with reference to FIG. 4. When using the trainer function, two radio control transmitters 1 are communicably connected to each other with a specific transmission channel 100 dealing with the trainer function. In reality, the transmission channel 100 may be a cable or may be wireless.

After a proper operation, one of the radio control transmitters 1 works as a radio control transmitter for the trainer 1A, the other works as a radio control transmitter for the trainee 1B. Then, a trainer controls the radio control transmitter for the trainer 1A, and a trainee controls the radio control transmitter for the trainee 1B. Further, typically, a user may change the settings such as later-described channel order of the radio control transmitter for the user's convenience. In particular, a skilled user may further change the settings. Further, the steered object needs to adjust according to the changed settings of the radio control transmitter. Upon a training using the trainer function, firstly, because it is necessary to avoid a serious fault such as a falling due to the trainee's steering, normally, a steered object 10 which is adjusted according to the settings of the radio control transmitter for the trainer 1A is used.

When the trainer function is valid, firstly, the radio control transmitter for the trainee 1B does not transmit the steering signal. Instead, a signal having control amount data (operational data) corresponding to the steering operation is transmitted to the radio control transmitter for the trainer 1A via the transmission channel 100. This signal transmitted from the radio control transmitter for the trainee 1B to the radio control transmitter for the trainer 1A via the transmission channel 100 is a trainer signal (indirect steering signal) and is separated from the steering signal transmitted to the steered object (direct steering signal). Incidentally, the control amount data includes: a value corresponding to the operational amount of such as a lever stick; and data merely indicating on/off of a specific function.

Further, as a format of the trainer signal, a proper format may be defined corresponding to a system of the transmission channel 100. For example, the above-explained PPM signal can be applied. In particular, when the transmission channel 100 is a cable, so-called trainer cable, the PPM signal is often used as the trainer signal.

When the trainer function is valid, next, an operation of a trainer switch 6 is valid at the radio control transmitter for the trainer 1A. It can switch between the above-described passive mode and active mode by the operation of the trainer switch 6.

On one hand, in the passive mode, the radio control transmitter for the trainer 1A can transmit the steering signal corresponding to the trainer signal transmitted via the transmission channel 100. On the other hand, in the active mode, even when the trainer signal is transmitted from the radio control transmitter for the trainee 1B via the transmission channel 100, the radio control transmitter for the trainer 1A does not transmit the steering signal corresponding to the trainer signal. Instead, the radio control transmitter for the trainer 1A transmits the trainer side steering signal generated corresponding to an operation on the radio control transmitter for the trainer 1A.

For example, when the trainer function is valid, normally, the trainer sets the passive mode to allow the trainee to steer the steered object 10. However, when the flight condition is unstable by the trainee's operation, or upon a difficult control situation such as landing, the trainer switches from the passive mode to the active mode to allow the trainer to steer the steered object corresponding to the trainer's operation on the radio control transmitter for the trainer 1A. In this way, owing to the trainer function, the trainee can practice the steering under a condition that the trainer can assist at any time.

4. Operative Mode of a Radio Control Transmitter for the Trainer in the Trainer Function Further, when the trainer function of this embodiment is valid, the radio control transmitter for the trainer 1A runs any one of the first to the third operative modes schematically shown in FIGS. 5A to 5C. Incidentally, the mode selection among the first to the third modes is done by, for example, the operator's operation. Further, each operative mode in FIGS. 5A to 5C shows a basic configuration, and as described later, the second and the third modes of FIGS. 5B, 5C includes later-described configurations of FIGS. 11A, 11B corresponding to the channel conversion function (the first example) of this embodiment.

Figure 5A:
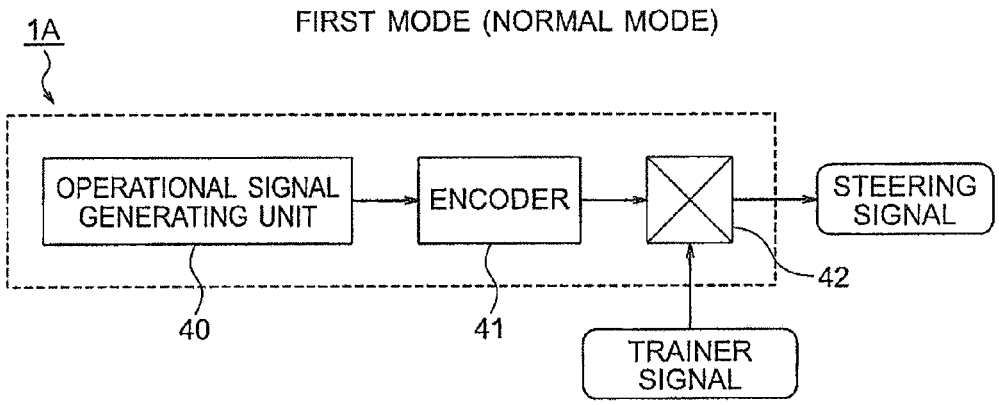
FIGS. 5A to 5C are block diagrams showing functional structural examples corresponding to operational modes of the radio control transmitter for the trainer in the trainer function.

First, FIG. 5A shows schematically the first mode (normal mode) operation. An operational signal generating unit 40 shown in FIG. 5A generates the operational signal in which the channels are assigned according to the channel order set by the radio control transmitter for the trainer 1A corresponding to the steering operation with the operational element mounted on the radio control transmitter for the trainer 1A. The operational signal generated here having the channel data is inputted to an encoder 41. The encoder 41 calculates the control amount of the controlled object (for example, servo) from the inputted operational signal per channel as an encode processing. Then, the calculated control amount data (steering data) is assigned to the channel, and a base of the steering signal is generated and outputted to a selector 42. The selector selects any one of the signal from the encoder 41 and the trainer signal transmitted from the radio control transmitter for the trainee 1B. This signal selection corresponds to an operation on the trainer switch 6. Namely, the selector 42 selects the trainer signal when the passive mode is set by the operation on the trainer switch 6, and selects the signal from the encoder 41 when the active mode is set. Thus, the signal selected by the selector 42 is outputted to the steered object as the steering signal.

Figure 5B:
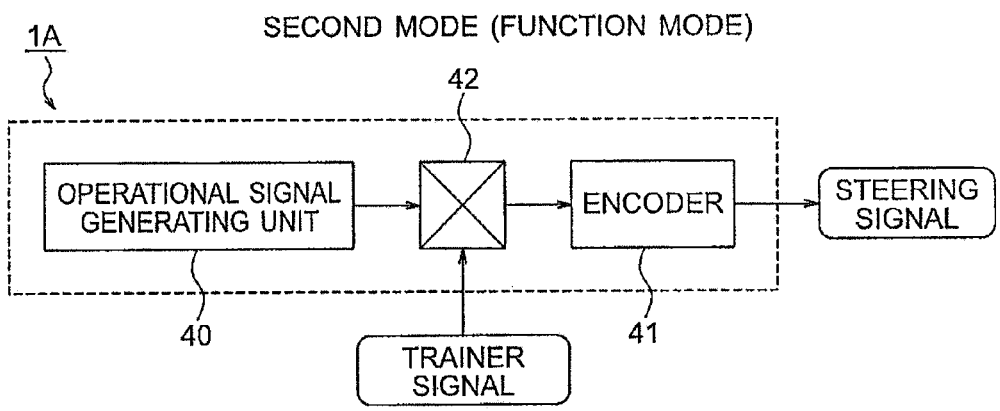

FIG. 5B shows the second mode (function mode). In the second mode, the operational signal generated by the operational signal generating unit 40 is firstly outputted to the selector 42. In this case also, the selector 42 outputs the trainer signal when the passive mode is set, and outputs the operational signal from the operational signal generating unit 40 when the active mode is set corresponding to the operation on the trainer switch 6. In this case, an output of the selector 42 is outputted to the encoder 41. When the operational signal from the operational signal generating unit 40 is inputted, the encoder 41 encodes the operational signal and outputted the encoded signal as the steering signal. When the trainer signal is inputted, the encoder 41 converts the format of the trainer signal which is inputted as necessary, and outputs the converted signal as the steering signal.

Figure 5C:
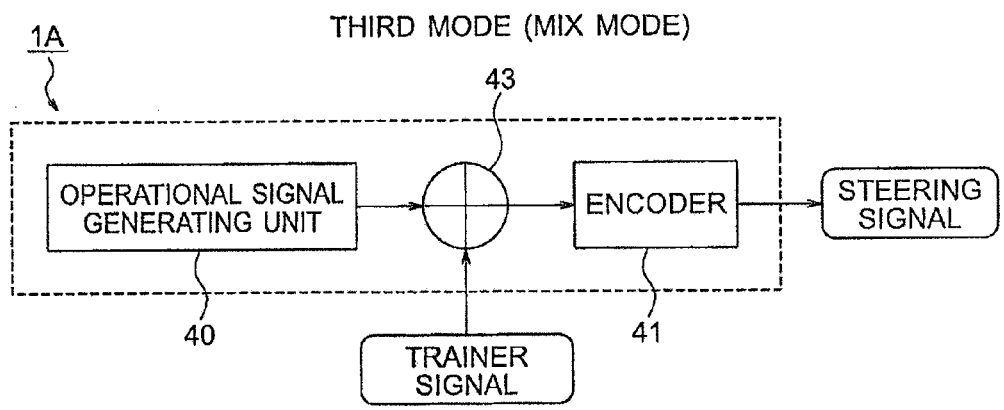

FIG. 5C shows the third mode (mix mode). In the third mode, the operational signal outputted from the operational signal generating unit 40 is inputted into a combiner 43. The combiner 43 combines the operational signal and the trainer signal according to a specific combining ratio, and outputs the combined signal to the encoder 41. The encoder 41 encodes the inputted signal and outputs as the steering data. In this case, the steering data is a combination of the control amount corresponding to the operation on the radio control transmitter for the trainer 1A, and the control amount corresponding to the operation on the radio control transmitter for the trainee 1B. This third mode is used in a case that while the trainee steers, the trainer subsidiarily steers to correct the flight condition. Namely, in the third mode, even in the passive mode, the operation on the radio control transmitter for the trainer 1A is reflected to the flight condition. Incidentally, in the active mode, the steering signal only corresponding to the operation on the radio control transmitter for the trainer 1A is outputted for safety's sake. Namely, the combiner 43 sets the combining ratio so as to output the steering signal only from the operational signal generating unit 40 to the encoder 41.

5. Problems in a Conventional Trainer Function

By the way, in the conventional trainer function, in the passive mode, when the radio control transmitter for the trainer 1A outputs the steering signal based on the trainer signal from the radio control transmitter for the trainee 1B, the radio control transmitter for the trainer 1A reflects the channel order set by the radio control transmitter for the trainee 1B without change. Namely, the control amount of CH1 to CHn in the trainer signal is replaced with the control amount of CH1 to CHn in the steering signal without change.

However, as described above, in a current aspect, the channel orders of the radio control transmitter for the trainer 1A and of the radio control transmitter for the trainee 1B may be not the same, and may be different from each other.

For example, it goes without saying that the default setting of the channel order varies by types of the radio control transmitters, in particular, recently, a radio control transmitter of which channel order can be changeable by a user setting has become common. A user can customize the setting to fit the radio control transmitter to user's steering by changing the channel order. Accordingly, the channel order is more often changed as the operator's skill increases. On the contrary, a beginner often uses the default setting channel order without change. Under such a condition, it frequently occurs that the channel orders of the trainer and of the trainee are different from each other.

Figure 6:
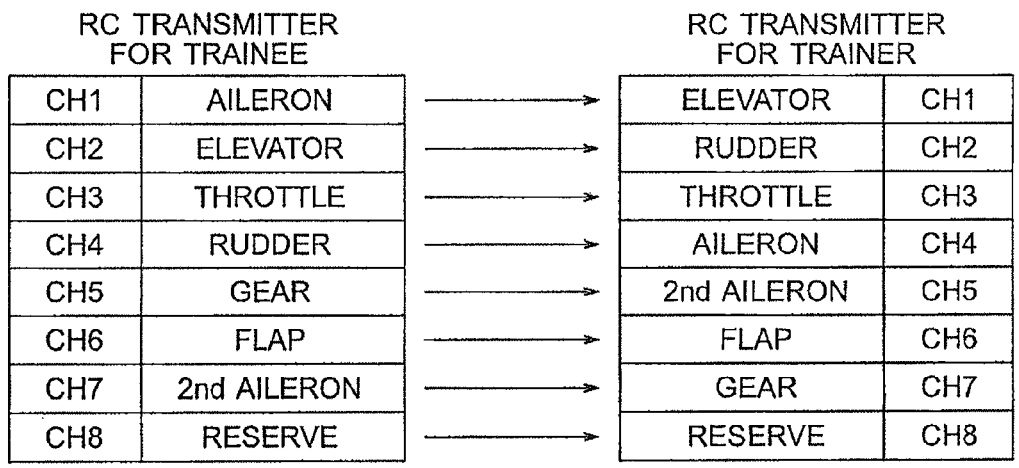
FIG. 6 is a table showing an example of the channel orders set in the radio control transmitters for the trainer and for the trainee.

FIG. 6 shows a concrete example that the channel orders of the radio control transmitter for the trainer 1A and of the radio control transmitter for the trainee 1B are different from each other. In FIG. 6, an example of the channel order of the radio control transmitter for the trainee 1B is shown in the left side of the paper. An example of the channel order of the radio control transmitter for the trainer 1A is shown in the right side of the paper. In this case, the channel order of the radio control transmitter for the trainer 1A is the same as the channel order shown in FIG. 2. On the contrary, the channel order of the radio control transmitter for the trainee 1B is CH1:aileron, CH2:elevator, CH3:throttle, CH4:rudder, CH5:gear, CH6:flap, CH7:$2^{nd}$ aileron and CH8:reserve. In this case, CH3:throttle and CH6:flap are the same, but other channels are different.

Under a condition that the channel orders of the radio control transmitter for the trainer 1A and of the radio control transmitter for the trainee are different from each other, suppose that the steering signal is transmitted in the passive mode according to the channel order of the radio control transmitter for the trainee 1B similar to the above. Incidentally, when using the trainer function, typically, the steered object having the setting corresponding to the radio control transmitter for the trainer 1A, namely, the radio control transmitter which transmits the steering signal is used. In this embodiment also, such a steered object is used.

Under this condition, suppose that the trainee operates in an effort to move the aileron. According to the example in FIG. 6, CH1 is assigned to the aileron in the radio control transmitter for the trainee 1B, and the control amount corresponding to the operation of aileron is transmitted via CH1 of the radio control transmitter for the trainee 1B. The radio control transmitter for the trainer 1A transmits the control amount data of CH1 as the steering signal of CH1 data without change. However, in the radio control transmitter for the trainer 1A, CH1 is assigned to the elevator. Resultingly, the operation for the aileron operated at the radio control transmitter for the trainee 1B moves the elevator of the steered object. Namely, if this goes on, in the passive mode, the radio control transmitter for the trainee 1B cannot properly steer the steered object.

Such a problem also occurs in any one of the first to third modes shown in FIGS. 5A to 5C. In the first mode shown in FIG. 5A, when the selector 42 selects the trainer signal, the trainer signal is outputted as the steering signal in a manner that the trainer signal passes through the radio control transmitter for the trainer 1A. Naturally, each of CH1 to CH8 of the trainer signal is reflected in each of CH1 to CH8 of the steering signal without change. Further, in the second and third mode shown in FIGS. 5B and 5C, although the trainer signal passes through the encoder 41, in the encoder 41, data of CH1 to CH8 of the trainer signal is replaced with data of CH1 to CH8 of the steering data without change. Accordingly, each of CH1 to CH8 of the trainer signal is reflected in each of CH1 to CH8 of the steering signal without change.

For solving such a problem, for example, as described above, if any one of the radio control transmitter for the trainer 1A and the radio control transmitter for the trainee 1B can change the channel order, the channel orders can be matched. Namely, after confirming both of channel orders, the radio control transmitter of which channel order is changeable matches the channel order of its own to the channel order of the mating radio control transmitter.

However, this operation for changing the channel order is practically very complicated. For example, when changing the channel order at the radio control transmitter for the trainer 1A side, the setting of the steered object also must be changed corresponding to the channel order change such as servo connection.

Further, as data related to the channel, the settings of end point, fail safe, sub trim or the like are known. The end point means a range of a rudder angle. The fail safe sets a motion of the steered object when the receiver cannot receive the steering signal, for example, due to jamming of the steering signal, or due to low battery charge. The sub trim concerns a fine adjustment of the servo when the operational element is in a neutral position. These parameters also should be replaced corresponding to the changed channels when the channel order is changed.

In this way, when the channel order is changed, the operations for the channel order change are very complicated, and troublesome for a user. Further, a setting mistake tends to take place.

Further, in the radio control transmitter 1 of this embodiment, a setting so-called mixing can be set. The mixing is a function to provide a predetermined control amount to the other controlled object in conjunction with an operation on a main channel, said main channel being a channel corresponding to a specific controlled object. This mixing function is often used in a tailless airplane as the steered object. Incidentally, these channels in conjunction with the main channel are referred to as virtual channels. The control amount of the virtual channel is generated by the encoder 41 of the radio control transmitter for the trainer 1A corresponding to an operation on the radio control transmitter for the trainer 1A, and is assigned to the channel of the steering signal according to the channel order. However, in the conventional trainer function, when the operational data of the trainer signal is inputted, the encoder 41 simply assigns the control amount as the operational data to the channel of the steering signal and transmits. Accordingly, in not only the first mode shown in FIG. 5A but also the second and third modes shown in FIGS. 5B and 5C, the steering signal corresponding to the trainer signal input does not include the control amount data corresponding to the virtual channel. Namely, in the trainer function, the mixing cannot work corresponding to the operation on the radio control transmitter for the trainee 1B.

6. A Channel Conversion Function According to this Embodiment

Outline

Accordingly, in the radio control transmitter 1 of this embodiment, for solving the above-described problem, a later-described channel conversion function is provided corresponding to the trainer function.

The channel conversion conceptually means to replace the channels under the radio control transmitter for the trainee 1B side channel order with the channels under the radio control transmitter for the trainer 1A side channel order. Further, according to this replacement result, the operational data in each channel of the trainer signal is assigned to the channels of the steering signal, and then the data is transmitted to the steered object.

Figure 7:
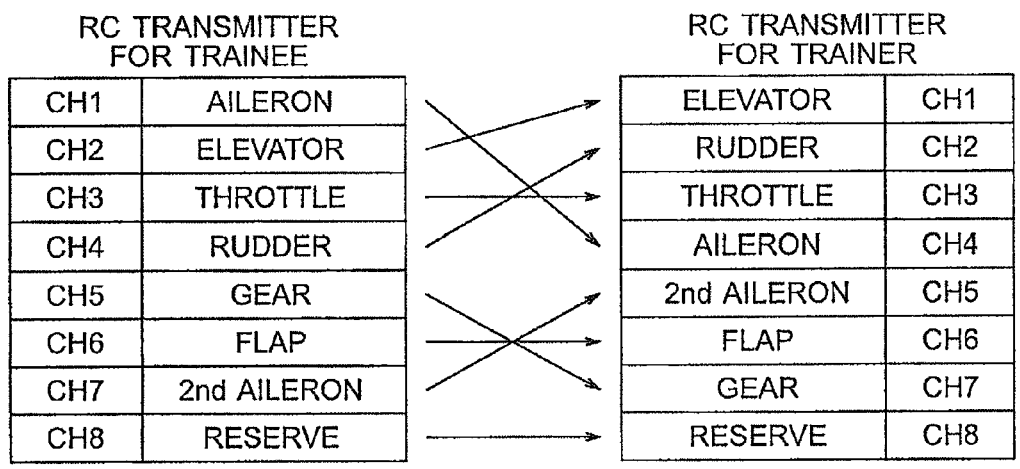
FIG. 7 is a table showing an example of a result of a channel conversion process according to the embodiment.

FIG. 7 shows an example of the channel conversion of this embodiment in the channel order shown in FIG. 6. CH1 set at the radio control transmitter for the trainee 1B side in FIG. 7 is taken for example. In the radio control transmitter for the trainee 1B, aileron is assigned to this CH1. Under this condition, suppose that an operation on the radio control transmitter for the trainee 1B with regard to this CH1:aileron is operated. In the radio control transmitter for the trainer 1A, as shown in FIG. 7, aileron is assigned to CH4. There, the radio control transmitter for the trainer 1A assigns the operational data (control amount data) corresponding to the operation on aileron to CH4 of the steering signal according to an arrow in FIG. 7, and transmits the steering signal to the steered object. Further, suppose that an operation is operated on elevator assigned to CH2 of the radio control transmitter for the trainee 1B. In the radio control transmitter for the trainer 1A, elevator is assigned to CH1. There, the radio control transmitter for the trainer 1A assigns the operational data corresponding to the elevator operation to CH1 of the steering signal, and transmits the steering signal to the steered object. Similarly, when the operations corresponding to throttle, rudder, gear, flap, $2^{nd}$ aileron, and (reserve) assigned to CH3 to CH8 is operated at the radio control transmitter for the trainee 1B, the radio control transmitter for the trainer 1A assigns the operational data corresponding to these controlled objects to CH3, CH2, CH7, CH6, CH5, and (CH8), and transmits.

Namely, in the trainer function, the steering operation is operated under the channel order at the radio control transmitter for the trainee 1B side. In the radio control transmitter for the trainer 1A receiving the trainer signal corresponding to this operation, resultingly, the steering signal in which the operational data is assigned to the channels under the channel order set at the radio control transmitter for the trainer 1A side is transmitted.

In this way, when the steering signal is transmitted after the channel conversion, even if the channel order of the radio control transmitter for the trainee 1B is different from the channel order of the radio control transmitter for the trainer 1A, the steered object is properly steered with the steering signal corresponding to the trainer signal of the radio control transmitter for the trainee 1B.

7. The Channel Conversion Function According to this Embodiment

A First Example

[7-1. System Configuration]

Figure 8:
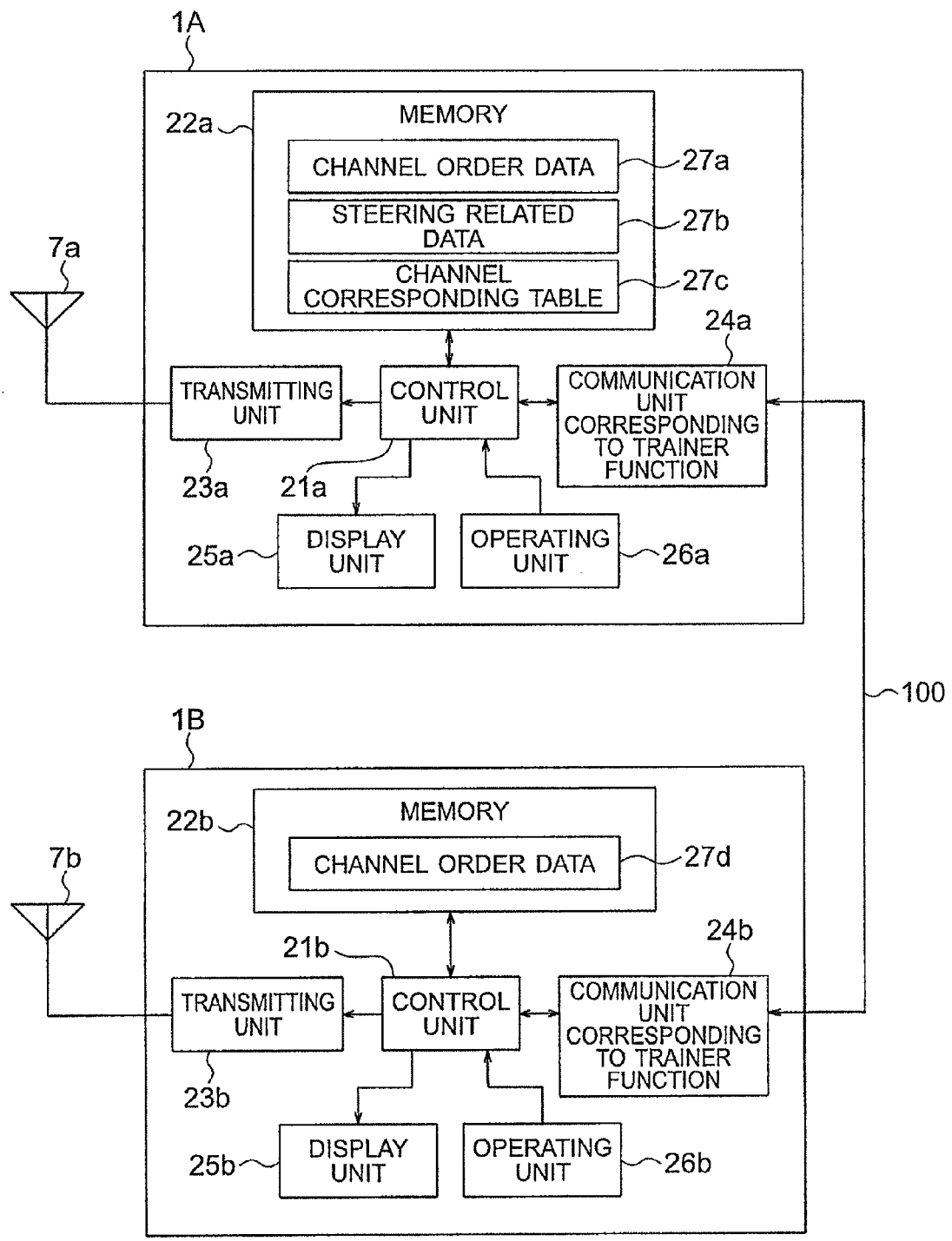
FIG. 8 is a block diagram showing an example of a system configuration of the radio control transmitters for the trainer and for the trainee corresponding to a first example of a channel conversion function according to the embodiment.

Two examples, the first example and the second example are given as a configuration for realizing the above channel conversion according to this embodiment. Firstly, the first example will be explained. FIG. 8 shows a system configuration of the radio control transmitters for the trainer 1A and for the trainee 1B corresponding to the first example. First, in the radio control transmitter for the trainer 1A, a control unit 21a, a memory 22a, a transmitting unit 23a, a communication unit corresponding to trainer function 24a, a display unit 25a, and an operating unit 26a are shown. The control unit 21a has, for example, a CPU, and executes various control processings of the radio control transmitter for the trainer 1A.

The memory 22a stores data which the control unit 21a uses. A program which is executed by the control unit 21a (CPU) and various data used for control processing by the control unit 21a are examples of the data stored in the memory 22a. In FIG. 8, channel order data 27a, steering related data 27b, channel corresponding table 27c are shown as the data stored in the memory 22a.

The channel order data 27a indicates the contents of the channel order set in the radio control transmitter for the trainer 1A. Namely, as shown in right sides of FIGS. 6 and 7, a relationship between the controlled object and the cannel number is shown.

The steering related data 27b is composed of control values such as end point, fail safe, and sub trim which are reflected to the steering data of specific channel in the steering signal as necessary. Further, the steering related data 27b also includes data of virtual channels obtained corresponding to the setting of mixing.

The channel corresponding table 27c indicates a relationship between the channels assigned to the controlled objects as a correspondence relationship between the channel orders of the radio control transmitters for the trainer 1A and for the trainee 18 as described later. This channel corresponding table 27c is generated corresponding to a later-described assignment of channels with regard to the radio control transmitter for the trainer 1A. The result of the channel assignment reflects the contents of the channel corresponding table 27c.

The transmitting unit 23a executes a transmission of a signal to be transmitted to the steered object, namely, the steering signal. For example, the control unit 21a passes transmitting data as the steering signal to the transmitting unit 23a. The control unit 21a executes a specific modulation of the received transmitting data, and transmits the data as the steering signal from an antenna 7a.

The communication unit corresponding to trainer function 24a communicates with the radio control transmitter for the trainee 1B via the transmission channel 100 formed corresponding to the trainer function. For example, the trainer signal is transmitted via the transmission channel 100 from the radio control transmitter for the trainee 1B. The communication unit corresponding to trainer function 24a receives the trainer signal, converts the trainer signal into a signal which is processable in the control unit 21a, and sends the signal to the control unit 21a. When the trainer signal is validly set, the control unit 21a transmits the steering signal into which the control amount data of the received trainer signal is reflected. In the first example, before the steering signal is transmitted, the channel conversion is executed as described later.

The display unit 25a is composed of a specific display device, and an image is displayed on the display unit 25a by a display control of the control unit 21a. A panel on the display unit 25a on which the image is displayed corresponds to the display screen 3 shown in FIG. 1. Incidentally, the display device used in the display unit 25a is not limited, however, under the present condition, an LCD display, an organic EL display or the like can be used.

The operating unit 26a includes various operational elements mounted on the radio control transmitter for the trainer 1A in a lump. When one of the operational elements composing the operating unit 26a is operated, an operational signal corresponding to the operational element is inputted to the control unit 21a. The control unit 21a executes a proper processing corresponding to the inputted operational signal. For example, when the trainer function is invalid, or in the active mode of the trainer function, for example, the stick lever (2L, 2R) is operated, the control unit 21a encodes for calculating the control amount corresponding to this operation, and generates the steering data in which the control amount data (operational data) is assigned to the proper channel according to the channel order shown in the channel order data 27a. Then, this steering signal is transmitted to the steered object by the transmitting unit 23a.

Incidentally, the configurations of the operational signal generating unit 40, the encoder 41, the selector 42, and the combiner 43 in the first to third mode shown in FIGS. 5A to 5C are identified as the processings executed by the control unit 21a.

Next, the radio control transmitter for the trainee 1B (the radio control transmitter 1 for the trainee) shown in FIG. 8 includes a control unit 21b, a display unit 25b, a memory 22b, a transmitting unit 23b, a communication unit corresponding to trainer function 24b, a display unit 25b, and a operating unit 26b similar to the radio control transmitter for the trainer 1A. However, in the first example of the channel conversion function, the radio control transmitter for the trainee 1B does not include the channel corresponding table 27c. In this case, the memory 22b of the radio control transmitter for the trainee 1B includes the channel order data 27d. The channel order data 27d includes a content indicating the channel order set at the radio control transmitter for the trainee 1B side as shown in the left sides of FIGS. 6 and 7. Incidentally, the radio control transmitter for the trainee 1B may include the steering related data, however, the steering related data is omitted here in the memory 22.

Further, for the sake of convenience, in the later explanation, the channel order setting indicated by the channel order data 27a in the radio control transmitter for the trainer 1A is the same as the right sides of FIGS. 6 and 7. Similarly, the channel order setting indicated by the channel order data 27d in the radio control transmitter for the trainee 1B is the same as the left sides of FIGS. 6 and 7.

[7-2. Channel Assignment Operation]

As described above, in the first example of the channel conversion processing according to this embodiment, the memory 22 of the radio control transmitter for the trainer 1A stores the channel corresponding table 27c corresponding to the trainer function. The channel corresponding table 27c is created by a user operating a channel assignment of the radio control transmitter for the trainer 1A.

Figure 9A:
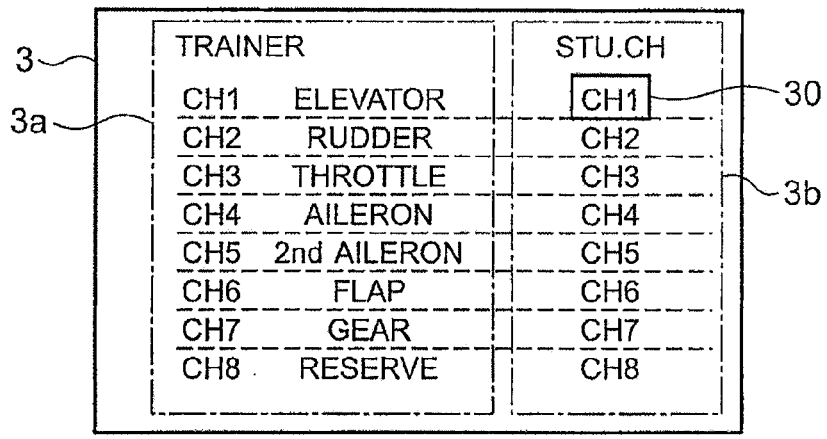
FIGS. 9A to 9C are tables showing examples of an operational screen for channel assignment.
Figure 9B:
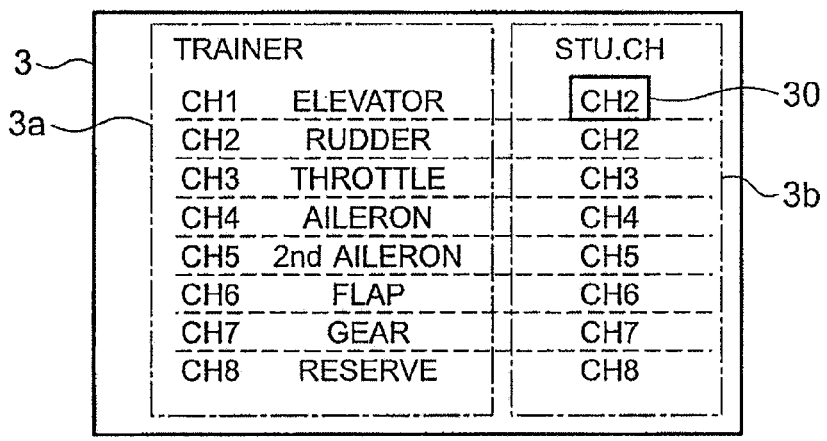
Figure 9C:
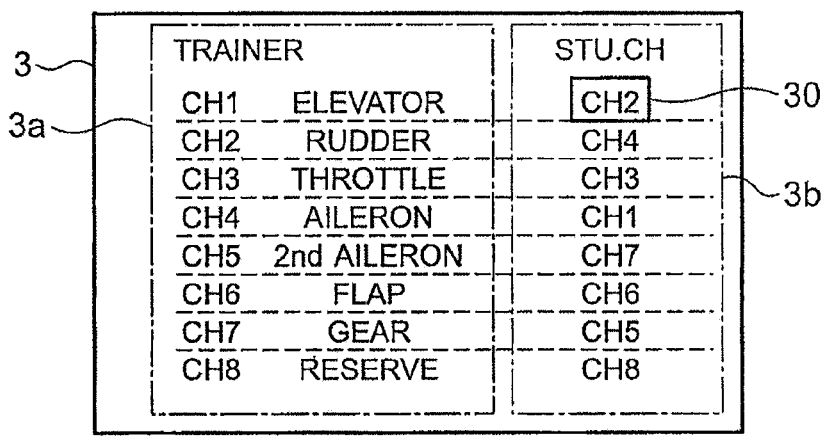

A concrete example of the channel assignment will be explained with reference to FIG. 9. For example, the operator (user) as a trainer operates the radio control transmitter for the trainer 1A to display an operational screen for the channel assignment on the display screen 3 as shown in FIG. 9A. The left side of the display screen 3 in FIG. 9A is a trainer side setting contents display area 3a. In this trainer side setting contents display area 3a, "TRAINER" is displayed at the top. Then, one controlled object name is assigned to each of CH1 to CH8 below the top. This shows the channel order set in the radio control transmitter for the trainer 1A. Incidentally, the channel order of the radio control transmitter for the trainer 1A shown in FIGS. 9A to 9C is the same as the channel order shown in FIGS. 6 and 7.

Next, the right side of the display screen 3 is a channel assignment operational area 3b. In the channel assignment operational area 3b, "STU. CH" is displayed at the top indicating that the channel numbers displayed here are the channel order of the radio control transmitter for the trainee 1B. Further, one channel number is assigned to each of CH1 to CH8 at the trainer side setting contents display area 3a below the top. These channel numbers indicates the channel numbers of the radio control transmitter for the trainee 1B assigned to CH1 to CH8 of the trainer side setting contents display area 3a. Further, in the channel assignment operational area 3b, a highlighting frame 30 is disposed. This highlighting frame 30 moves among the channel numbers displayed per column in the channel assignment operational area 3b corresponding to the operation. A user can change the channel number on the column at which the highlighting frame 30 is disposed.

For example, suppose that the operator for operating the channel assignment is a trainer. Previously the trainer has known the channel order of the radio control transmitter for the trainee 1B by, for example, asking the trainee. Here, suppose that the trainer is going to set the channel of the radio control transmitter for the trainee 1B corresponding to CH1 of the radio control transmitter for the trainer 1A. Then, as shown in FIG. 9A, the trainer moves the highlighting frame 30 on the first column in the channel assignment operational area 3b. According to the content in the trainer side setting contents display area 3a of FIG. 9A, elevator is assigned to CH1. On the other hand, elevator is assigned to CH2 of the radio control transmitter for the trainee 1B (FIGS. 6 and 7). So, as shown in FIGS. 9A and 9B, the trainer changes the channel number of the first column in the channel assignment operational area 3b into CH2.

Next, suppose that the trainer is going to assign the channel of the radio control transmitter for the trainee 1B to CH2 of the radio control transmitter for the trainer 1A. Rudder is assigned to CH2 of the radio control transmitter for the trainer 1A, however, rudder is assigned to CH4 of the radio control transmitter for the trainee 1B. So, the trainer moves the highlighting frame 30 to the second column in the channel assignment operational area 3b, and changes the channel number on the second column into CH4. Similarly, the trainer assigns one channel to each of CH3 to CH8 of the radio control transmitter for the trainer 1A. Thus, with the channel assignment operation, the channel of the radio control transmitter for the trainee 1B associated with the same controlled object to each of the channels of the radio control transmitter for the trainer 1A. After the channel assignment operation is finished, the display screen 3 is shown as FIG. 9C. With reference to FIG. 7, in the channel assignment operational area 3b of FIG. 9C, the channel number of the radio control transmitter for the trainee 1B associated with the same controlled object is set in every column corresponding to the channel number of the radio control transmitter for the trainer 1A shown in the trainer side setting contents display area 3a. For example, the trainer checks the contents shown on the display screen 3 as shown in FIG. 9C, and confirms the settings, then operates a decision operation.

After the decision operation of the channel assignment is done, the control unit 21a generates the channel corresponding table 27c shown in FIG. 10, and makes the memory 22a store the channel corresponding table 27c. In the channel corresponding table 27c shown in FIG. 10, one conversion channel is assigned to each of CH1 to CH8 as the trainee side channels. Here, the conversion channels are the channel numbers of the radio control transmitter for the trainer 1A associated with the same controlled objects corresponding to CH1 to CH8 of the trainee side channels. The relationship between the trainee side channels and the conversion channels in the channel corresponding table 27c is the same as the relationship between the trainer side setting contents display area 3a and the channel assignment operational area 3b shown in FIG. 9. Namely, this channel corresponding table 27c indicates the relationship between the channels of the radio control transmitter for the trainer 1A and of the radio control transmitter for the trainee 1B shown in FIG. 9C by arranging the channels of the radio control transmitter for the trainee 1B sequentially, and assigning the channels of the radio control transmitter for the trainer 1A thereto.

[7-3. Channel Conversion Process Configuration in a Second Mode (Function Mode)]

As previously explained with FIGS. 5A to 5C, in the trainer function, the radio control transmitter for the trainer 1A operates under any one of the first to third modes. The first example of the channel conversion function according to this embodiment at least applies to the second mode.

Figure 11A:
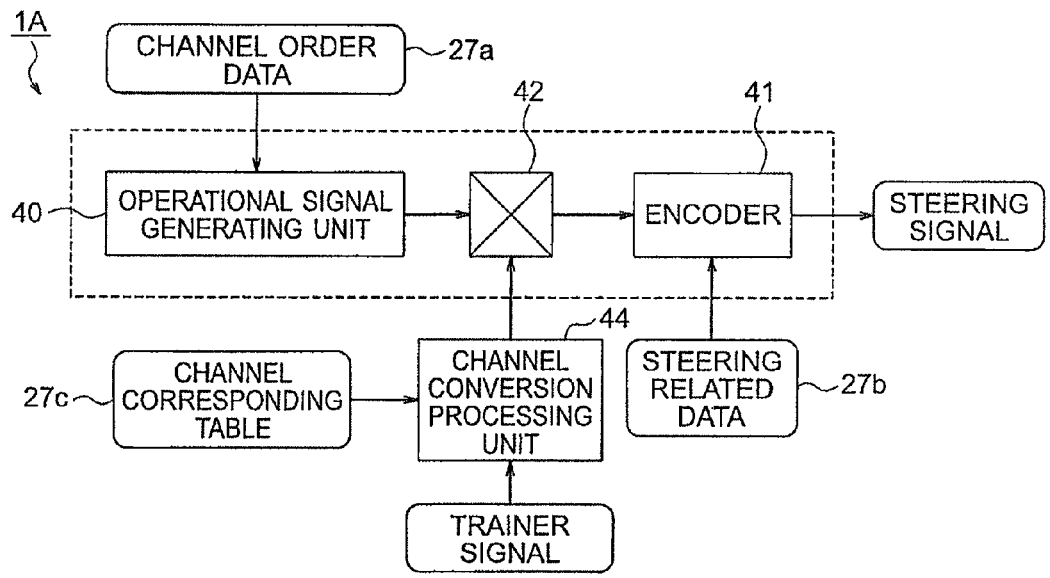
FIGS. 11A and 11B are block diagrams showing functional structural examples when the first example of the channel conversion function according to the embodiment is applied to second and third modes.

FIG. 11A shows a structural example in a case that the channel conversion function as the first example of this embodiment applies to the second mode. Incidentally, in FIGS. 11A and 11B, the same reference signs are used in the same parts as FIG. 5B.

Similar to FIG. 5B, firstly, the operational signal generating unit 40, the selector 42, and the encoder 41 are shown in FIG. 11A. For example, in the active mode of the trainer function, the operational signal generating unit 40 outputs the trainer signal in which the channels are assigned according to the channel order indicated by the channel order data 27a of the radio control transmitter for the trainer 1A. Here, the channel order data 27a also indicates a relationship of the operational element assigned to the controlled object of each channel. The operational signal generating unit 40 can recognize the channel to be assigned to the steering signal by the relationship between the operational elements and the channels corresponding to the steering signal indicated by the channel order data 27a. The selector 42 selects the steering signal from the operational signal generating unit 40, and outputs to the encoder 41. At this time, the operational signal generating unit 40 assigns the steering signal corresponding to one controlled object to one channel according to the channel order indicated by the channel order data 27a of the radio control transmitter for the trainer 1A, and outputs the steering signal to the encoder 41.

On this basis, as shown in FIG. 11A, a channel conversion processing unit 44 is provided on a pre-stage of the input of the trainer signal to the selector 42. Incidentally, in FIG. 8, the channel conversion processing unit 44 can be identified as a function executed by the control unit 21a of the radio control transmitter for the trainer 1A.

The channel conversion processing unit 44 of FIG. 11A functions in the passive mode of the trainer function, and operates as follows. The trainer signal transmitted from the radio control transmitter for the trainee 1B is inputted into the channel conversion processing unit 44 via the transmission channel 100. In the first example, the trainer signal is assigned to the controlled object of each channel according to the channel order set in the radio control transmitter for the trainee 1B. Namely, in the examples shown in FIGS. 6 and 7, the control amount data of aileron, elevator, throttle, rudder, gear, flap, $2^{nd}$ aileron, (reserve) are respectively assigned to CH1 to CH7 (CH8) of the trainer signal, and transmitted.

When the trainer signal is inputted, the channel conversion processing unit 44 refers the channel corresponding table 27c stored in the memory 22a. The trainee side channels CH1 to CH8 of the channel corresponding table 27c corresponds to CH1 to CH8 of the trainer signal. Then, the channel conversion processing unit 44 recognizes the converted channel numbers indicated by the channel corresponding table 27c in each of CH1 to CH8 of the inputted trainer signal. Then, the channel conversion processing unit 44 assigns the control amount data of each of CH1 to CH8 of the inputted trainer signal to the converted channel number. In a case of the channel corresponding table 27c of FIG. 10, the control amount data of CH1 of the inputted trainer signal is assigned to CH4. Further, the control amount data of CH2 of the inputted trainer signal is assigned to CH1. Similarly, the control amount data of CH3 to CH8 of the inputted trainer signal are respectively assigned to CH3, CH2, CH7, CH6, CH5, and CH8. In this way, the channel conversion processing unit 44 of the first example converts the channel numbers. Thus, the control amount data of each channel of the trainer signal is converted to the control amount data of the channels according to the channel order set in the radio control transmitter for the trainer 1A. Then, the data of which channel assignment is converted is transferred to the encoder 41 via the selector 42.

Figure 12:
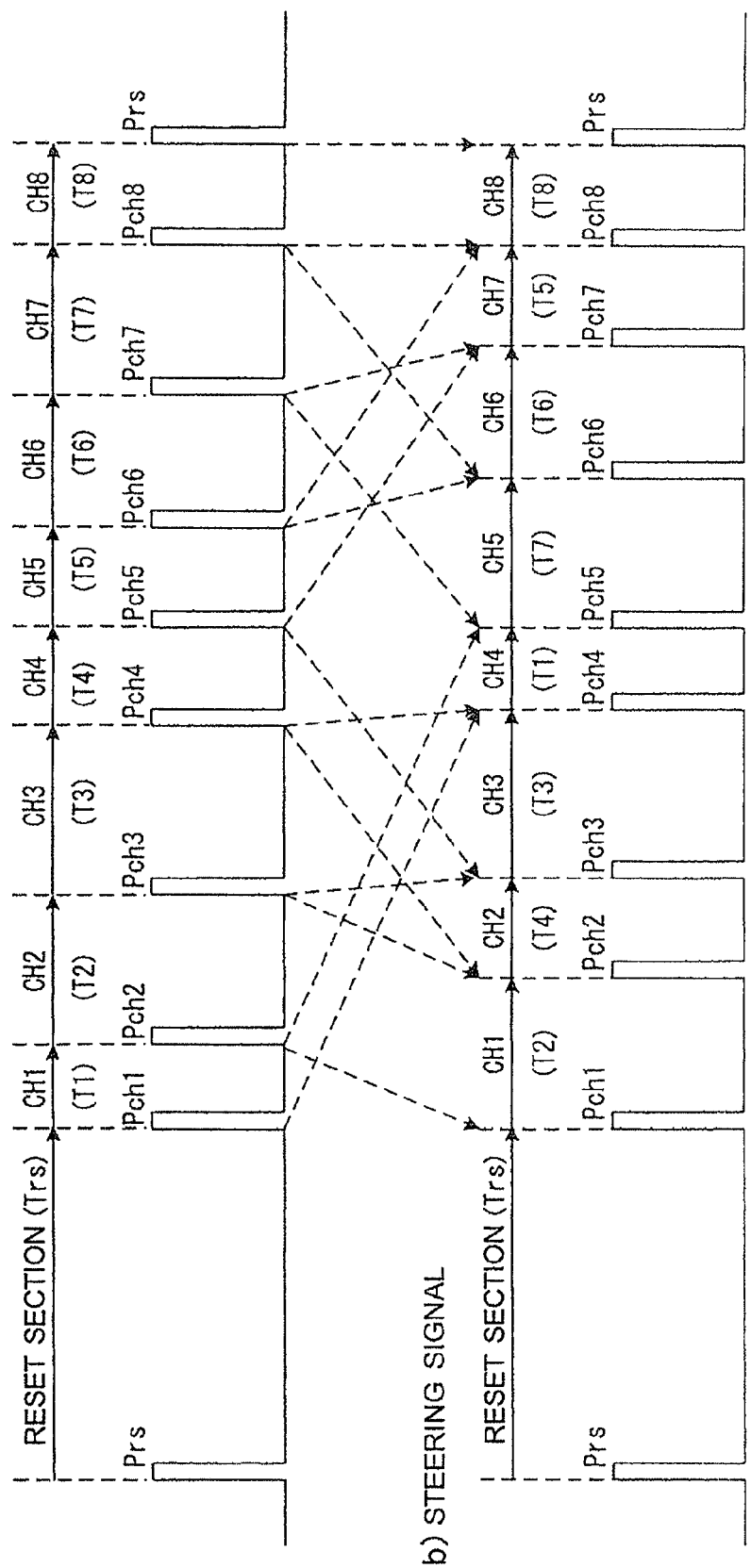
FIG. 12 shows a timing chart of an example of the trainer signal and the steering signal in the PPM signal format corresponding to the channel conversion process

The encoder 41 encodes according to the converted channel assignment data and generates the steering signal. FIG. 12 schematically shows an example of generating the steering signal. FIG. 12(a) shows the trainer signal (PPM signal format) which is inputted by the channel conversion processing unit 44. FIG. 12(b) shows the steering signal which is generated by the encoder 41 corresponding to an input of the trainer signal of FIG. 12(a). Incidentally, in this embodiment, the pilot signal is also in the PPM signal format.

As described above, in the format of the trainer signal, the control amount data of each channel is indicated by a pulse width. Here, the pulse widths corresponding to CH1 to CH8 in the trainer signal of FIG. 12(a) transmitted from the radio control transmitter for the trainee 1B are respectively indicated by T1 to T8.

Based on the channel corresponding table 27c, as described above, the data assigned to CH1 to CH8 of the trainer signal are respectively assigned to CH2, CH4, CH3, CH1, CH7, CH6, CH5, and CH8 of the radio control transmitter for the trainer 1A. In the steering signal of FIG. 12(b) attained by the encoder 41 encoding according to this assignment, as shown in FIG. 12(b), the pulse width of CH1 is the time T2. Namely, CH1 of the trainer signal includes the pulse width the same as CH2 of the trainer signal. This means that the control amount data of CH1 attained by the operation of elevator at the radio control transmitter for the trainee 1B is treated as the same control amount data of elevator of CH4 in the steering signal transmitted from the radio control transmitter for the trainer 1A.

Similarly, CH2 of the steering signal includes the pulse width T4 the same as CH4 of the trainer signal. CH3 to CH8 of the steering signal respectively include pulse widths T3, T1, T7, T6, T5, T8 the same as CH3, CH1, CH7, CH6, CH5, and CH8 of the trainer signal. Namely, the control amount data attained by operations of rudder at CH4, throttle at CH3, aileron at CH1, 2" aileron at CH7, flap at CH6, gear at CH5, (and reserve at CH8) in the radio control transmitter for the trainee 1B are treated as the data of the same rudder, throttle, aileron, $2^{nd}$ aileron, flap, gear, (and reserve) at CH2 to CH7 (and CH8) in the steering signal.

When the steering signal generated in this way is transmitted to the steered object, the servo and the like of the steered object are properly driven according to the steering operation on the radio control transmitter for the trainee 1B. Namely, the steered object is moved according to the steering operation of the trainee on the radio control transmitter for the trainee 1B.

Thus, in this embodiment, in response to the trainer signal input from the radio control transmitter for the trainee 1B, after the channel conversion, in which the control amount data of each channel is assigned to the channel of the radio control transmitter for the trainer 1A associated with the same controlled object, is performed, the steering signal is transmitted. In this way, even when the channel orders of the radio control transmitters for the trainer 1A and for the trainee 1B are different from each other, the steered object correctly responds to the steering at the radio control transmitter for the trainee 1B side.

Here, as previously explained with FIG. 9, for a proper channel conversion operation of this embodiment, a user as an operator needs to operate the channel assignment. However, this assignment is done by only assigning the channel of the radio control transmitter for the trainee 18 to the controlled object in the channel order of the radio control transmitter for the trainer 1A. Therefore, it is a very simple operation in comparison with the conventional channel order change.

In particular, when the channel order is changed, the settings such as end point, fail safe, sub trim and the like of the radio control transmitter for the trainer 1A also should be changed. However, according to FIG. 11A, the channel order data 27a is used by the encoder 41. Namely, the controls of end point, fail safe, sub trim or the like set in the radio control transmitter for the trainer 1A are performed by the encoder 41 corresponding to the channel order of the radio control transmitter for the trainer 1A. Similarly, the virtual channel control of the mixing function is also performed by the encoder 41 corresponding to the channel order of the radio control transmitter for the trainer 1A. Further, according to the same FIG. 11A, the trainer signal is inputted into the encoder 41 after the channel conversion by the channel conversion processing unit 44. Further, in this embodiment, the data of channel assign of the trainer signal reassigned corresponding to the channel order of the radio control transmitter for the trainer 1A is given to the encoder 41. Namely, the data given to the encoder 41 is according to the channel order of the radio control transmitter for the trainer 1A. Therefore, even in the passive mode of the trainer function, the encoder 41 can encode the inputted data as same as the steering signal attained by the normal operation on the radio control transmitter for the trainer 1A, similar to the case that the trainer function is off. In this way, in this embodiment, end point, fail safe, sub trim, and the like are moved properly corresponding to the steering at the radio control transmitter for the trainee 1B side, even in the passive mode of the trainer function.

Further, in the above explanation, the radio control transmitters for the trainer 1A and for the trainee 1B are the same type. However, this configuration can be adopted to a case that the types of the radio control transmitters for the trainer 1A and for the trainee 1B are different from each other.

In this case, for example, the radio control transmitter for the trainer 1A often is a higher class than the radio control transmitter for the trainee 1B. The maximum channel number of the higher class model tends to be larger. So, there is a high possibility that the maximum channel number of the radio control transmitter for the trainee 1B is fewer than that of the radio control transmitter for the trainer 1A. However, even in this case, according to the channel conversion function of this embodiment, the radio control transmitter for the trainer 1A can generate the steering signal without storing operational data regarding the channels which are not assigned to the radio control transmitter for the trainee 1B. Namely, in this embodiment, the difference of the channel numbers due to the difference of the model types may not cause a problem.

[7-4. Channel Conversion Process Configuration in a Third Mode (Mix Mode)]

Figure 11B:
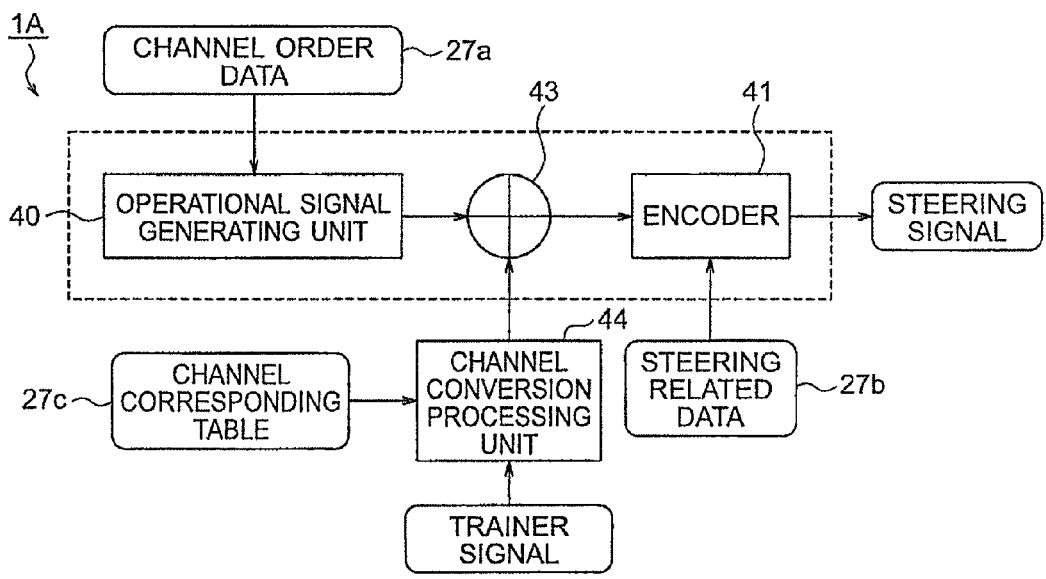

Further, the channel conversion function of this embodiment can be adapted not only to the second mode (function more) shown in 11A, but also to the third mode (mix mode). FIG. 11B shows a structural example of a system in which the channel conversion function as the first example is applied to the third mode. In this figure, the same reference signs are used in the same parts as FIG. 5C, and any further explanation is emitted. The channel conversion processing unit 44 of this case is inserted into a pre-stage of the input of the trainer signal to the combiner 43. Therefore, in the passive mode, the control amount data of each channel included in the inputted trainer signal are reassigned to the channel according to the channel order of the radio control transmitter for the trainer 1A by the channel conversion processing unit 44. In this way, for example, in the passive mode, when the steering signal is not outputted from the operational signal generating unit 40 (when the steering operation is not operated on the radio control transmitter for the trainer 1A), the steering signal after the channel conversion is properly outputted similar to the second mode in FIG. 11A. Further, when the trainer operates on the radio control transmitter for the trainer 1A for assistance, thereby, the steering signal is outputted from the operational signal generating unit 40, the combiner 43 properly combines the control amount data attained by the operation on the radio control transmitter for the trainer 1A with the control amount data based on the trainer signal in the same controlled objects according to the channel order of the radio control transmitter for the trainer 1A.

Further, in a case that the first example of this embodiment is applied to the third mode, because the data after the channel conversion is inputted into the encoder 41, the optional functions such as end point and the control of the virtual channel properly function similar to the case that the first example is applied to the second mode.

[7-5. Steering Signal Process Corresponding to the Channel Conversion Process

Figure 13:
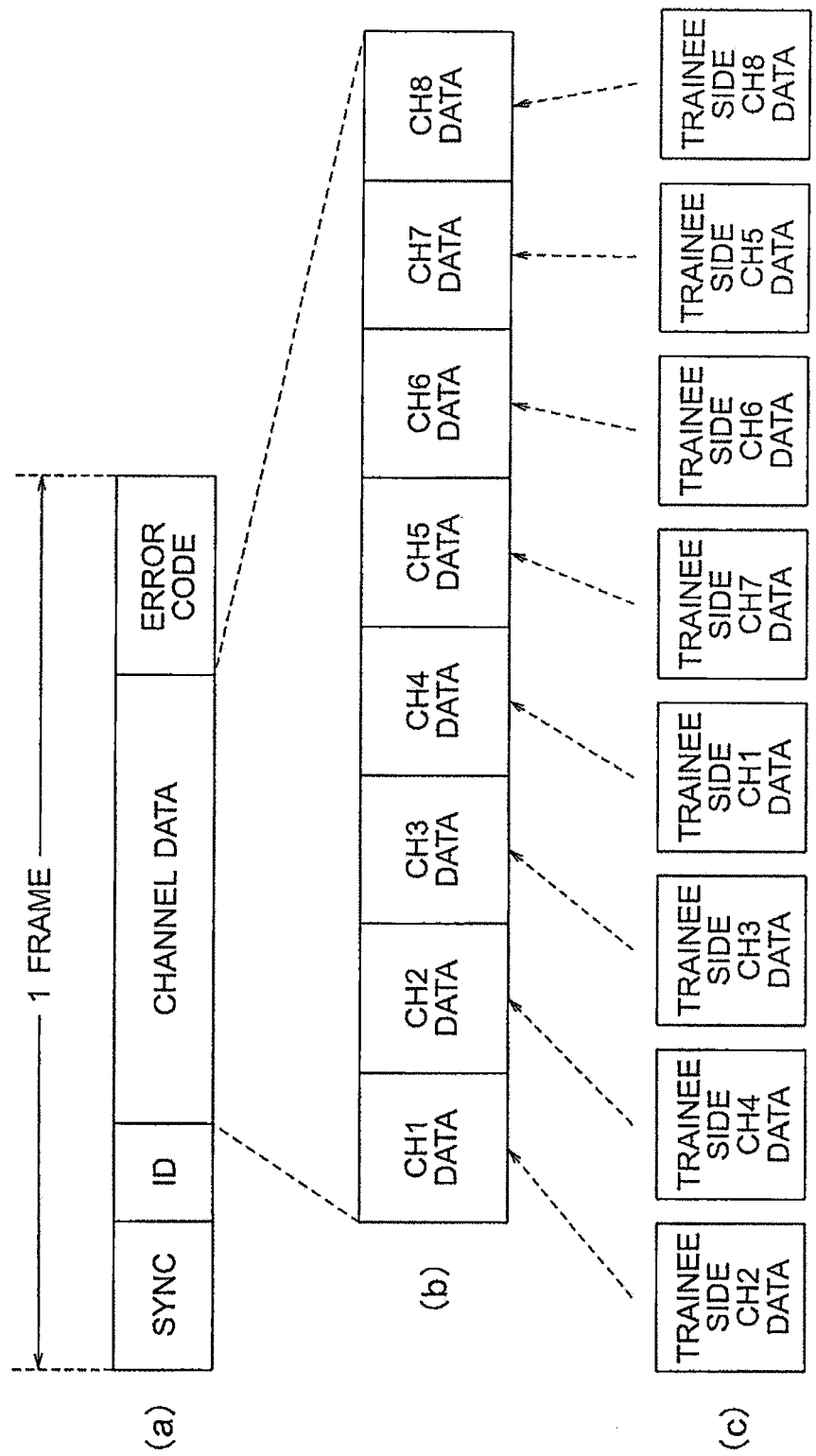
FIG. 13 is a view showing a frame format of the channel conversion process corresponding to the steering signal in 2.4 GHz range.

In the previous explanation of FIG. 12, the steering data is in the PPM signal format. A structural example of the transmitting data as the PPM signal is shown in FIG. 13A. FIG. 13A shows one frame of the transmitting data. When the radio control transmitter 1 of the present invention communicates, the one frame of the transmitting data shown in FIG. 13A is transmitted and received in a specific time interval. A configuration of the transmitting data in a frame unit shown in FIG. 13A is sequentially composed of top SYNC (synchronizing code), transmitter ID, channel data, and error code. SYNC is a synchronizing code in the transmitting data in a frame unit, and composed of a specific bit pattern with the specific bit number. The transmitter ID receives an ID (identifier) put on the radio control transmitter 1 which transmits this transmitting data with the specific bit number. Channel data receives the control amount data of each channel. In this embodiment, because the channel number of the radio control transmitter 1 is eight, as shown in FIG. 13(*b*), channel data is composed of data of CH1 to CH8 sequentially. Incidentally, the data of CH1 to CH8 respectively include specific fixed bit numbers which indicate the control amounts. Error code is added for the sake of, for example, error detection and error correction with regard to the channel data.

When the transmitting data shown in 13(*a*)(*b*) is transmitted as the steering data, in the passive mode, as previously explained with FIGS. 11A and 11B, the radio control transmitter for the trainer 1A of the first example of this embodiment execute the channel convert of the inputted trainer signal with the channel conversion processing unit 44, and send the control amount data to the encoder 41 via the selector 42 or the combiner 43. In this case, the encoder 41 receives the control amount data as the channel data of CH1 to CH8 in the transmitting data according to the channel numbers after the conversion. As a result, with reference to FIGS. 6 and 7, CH2 data of the radio control transmitter for the trainee 1B is stored in CH1 of the channel data as shown in FIGS. 13(*b*) and 13(*c*). Similarly, the data in CH4, CH3, CH1, CH7, CH6, CH5, and CH8 of the radio control transmitter for the trainee 1B are respectively stored in CH2 to CH8 of the channel data. Namely, each channel data in the radio control transmitter for the trainee 1B is stored in the channel in the radio control transmitter for the trainer 1A having the same controlled object. Then, the encoder 41 transmits the transmitting data as the steering signal. Thus, although the signal format is different, in the trainer function, the steering signal correctly reflecting the steering data of the radio control transmitter for the trainee 1B can be transmitted from the radio control transmitter for the trainer 1A as same as the PPM signal format steering signal.

8. The Channel Conversion Function According to this Embodiment

A Second Example

Figure 14:
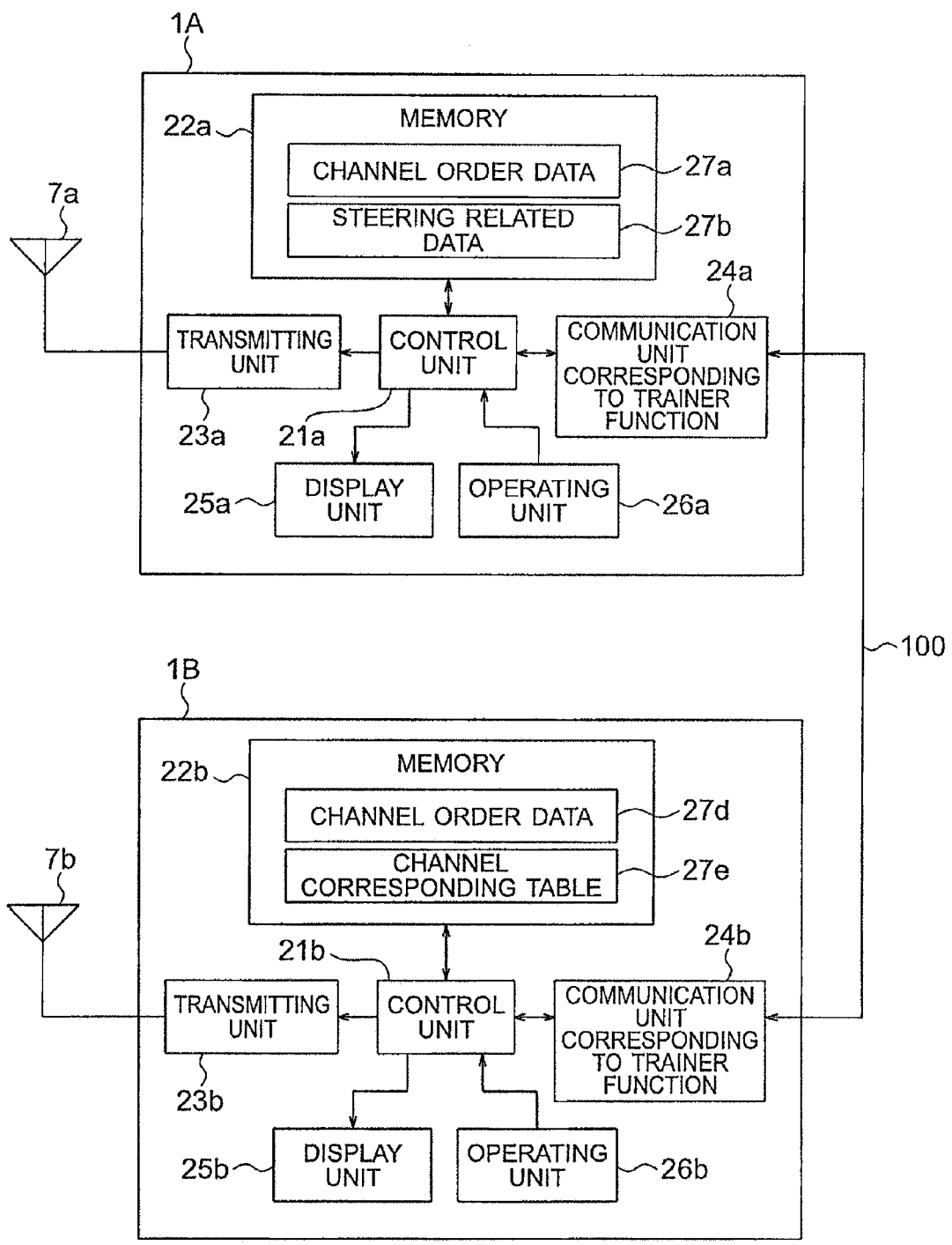
FIG. 14 is a block diagram showing an example of a system configuration of the radio control transmitters for the trainer and for the trainee corresponding to a second example of the channel conversion function according to the embodiment.

Next, a configuration of a second example of the channel conversion function of this embodiment will be explained. FIG. 14 shows an example of a system configuration of the radio control transmitters for the trainer 1A and for the trainee 1B. Incidentally, in this figure, the same reference signs are used in the same parts as FIG. 8, and any further explanation is emitted.

As shown in FIG. 14, in the second example, the memory 22*a* of the radio control transmitter for the trainer 1A does not include the channel corresponding table 27*c*. Instead, the memory 22*b* of the radio control transmitter for the trainee 1B includes the channel corresponding table 27*e*. Because the channel corresponding table 27*e* is included in the radio control transmitter for the trainee 1B, in the second example, the channel assignment is done not by the radio control transmitter for the trainer 1A but by the radio control transmitter for the trainee 1B.

However, as shown in FIG. 9, a user interface for the channel assignment in the first example works as in each channel number of the radio control transmitter for the trainer 1A displayed on the trainer side setting contents display area 3*a*, the channel number of the radio control transmitter for the trainee 1B is changed by the operation on the channel assignment operational area 3*b*. Namely, based on the channel number of the radio control transmitter for the trainer 1A, the channel number of the radio control transmitter for the trainee 1B is assigned. This operation mode is not bad when the channel assignment is done by the radio control transmitter for the trainer 1A. However, when the channel assignment is done by the radio control transmitter for the trainee 1B such as the second example, a user may be confused because the base radio control transmitter and the objective radio control transmitter are exchanged. So, contrary to the case in FIG. 9, in a user interface for channel assignment in the second example, preferably, based on the channel number of the radio control transmitter for the trainee 1B, the channel number of the radio control transmitter for the trainer 1A is assigned. For example, as an operational screen of the second example, instead of the trainer side setting contents display area 3*a* in FIG. 9, a trainee side setting contents display area is displayed showing the relationship between the channel number of the radio control transmitter for the trainee 1B and the controlled object. On that basis, in the right side channel assignment operational area 3*b*, the channel number of the radio control transmitter for the trainer 1A associated with the same controlled object is assigned to each of CH1 to CH8 in the trainee side setting contents display area.

The contents of the channel corresponding table 27*e* generated by the above channel assignment operation is substantially the same as the channel corresponding table 27*c* of the radio control transmitter for the trainer 1A in the first example. For example, when the channel orders of the radio control transmitters for the trainer 1A and for the trainee 1B are those shown in FIGS. 6 and 7, resultingly, the channel corresponding table 27*e* is the same as the table shown in FIG. 10.

Next, in the second example, the radio control transmitter for the trainee 1B operates the channel conversion process corresponding to the steering operation using the channel corresponding table 27*e* stored in the memory 22*a*. Then, the radio control transmitter for the trainee 1B transmits the channel converted trainer signal to the radio control transmitter for the trainer 1A.

Figure 15:
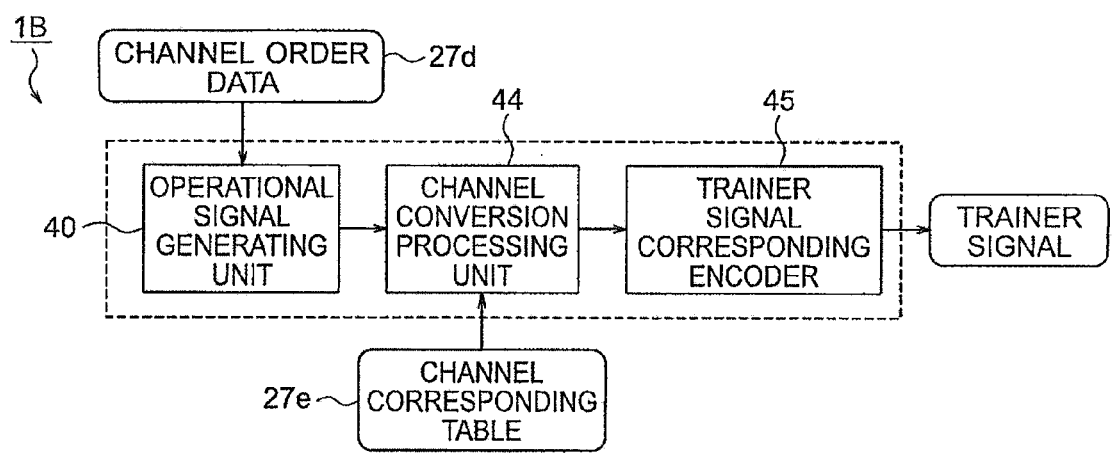
FIG. 15 is a schematic view showing a functional structural example of the radio control transmitter for the trainee corresponding to the second example of the channel conversion function.

FIG. 15 shows a functional structural example corresponding to the channel conversion function in the radio control transmitter for the trainee 1B. As shown in FIG. 15, the steering signal outputted from the operational signal generating unit 40 is firstly inputted into the channel conversion processing unit 44 corresponding to the steering operation on the operating unit 26*b* of the radio control transmitter for the trainee 1B. The channel conversion processing unit 44 firstly recognizes the channel number (trainee side channel number) corresponding to the inputted operational signal under the channel order of the trainee side set in the radio control transmitter for the trainee 1B with regard to the operational unit corresponding to the inputted operational signal. Next, with reference to the channel corresponding table 27*e*, the converted channel number assigned to the recognized trainee side channel number, namely, the channel number associated with the same controlled object in the channel order of the radio control transmitter for the trainer 1A is identified. Then, the inputted operational signal is associated with the identified converted channel number, and sent to a trainer signal corresponding encoder 45.

The trainer signal corresponding encoder 45 converts the operational signal into the control amount data, and assigns the control amount data (operational data) into the channel the same as the associated converted channel number among the channels of the trainer signal. In the trainer signal generated in this way, the control amount data in each of the controlled objects attained by the steering operation on the radio control transmitter for the trainee 1B is already converted into the data according to the channel order of the radio control transmitter for the trainer 1A. This trainer signal is transmitted from the radio control transmitter for the trainee 1B via the transmission channel 100 to the radio control transmitter for the trainer 1A.

In this case, at the radio control transmitter for the trainer 1A side, there is no need to operate the channel conversion process corresponding to the inputted trainer signal. Namely, it is unnecessary for the radio control transmitter for the trainer 1A to include the channel conversion processing unit 44 such as FIGS. 11A and 11B. In this case, the radio control transmitter for the trainer 1A can output the inputted trainer signal in any one of the first mode (normal mode), the second mode (function mode), and the third mode (mix mode) shown in FIGS. 5A to 5C.

For example, when the radio control transmitter for the trainer 1A is set in the passive mode of the trainer function in any one of the second mode (function mode) or the third mode (mix mode) shown in FIG. 5B or 5C, the trainer signal is inputted into the encoder 41 via the selector 42 or the combiner 43, converted into the steering signal, and outputted. Accordingly, similar to the first example, in the passive mode also, for example, parameters of the options such as end point, fail safe, and sub trim are valid. Further, in the mixing function, the control of the virtual channel is also valid.

On the other hand, when the first mode (normal mode) shown in FIG. 5A is set, the trainer signal is outputted as the steering signal not via the encoder 41. Therefore, the option functions and the control of the virtual channel are not valid. However, in the second example, when the radio control transmitter for the trainee 1B outputs the trainer signal, the assignment of the control amount in each controlled object corresponding to the channels of the trainer signal is already according to the channel order of the radio control transmitter for the trainer 1A. Therefore, in the first mode, the steering signal corresponding to the trainer signal is according to the channel order of the radio control transmitter for the trainer 1A, and includes the control amount data of each channel. Accordingly, in the second example, in a case that the radio control transmitter for the trainer 1A is moved in the first mode, when the radio control transmitter for the trainee 1B operates aileron, the aileron of the steered object is properly moved according to the control amount corresponding to the aileron operation. Namely, a basic action according to the object of the present invention that the steered object is properly moved according to the operation on the radio control transmitter for the trainee 1B is assured.

Incidentally, in the explanation described above, the channel assignment setting between the radio control transmitters for the trainer 1A and for the trainee 1B in each of the common controlled object is manually done using the operational screen shown in FIG. 9. However, the channel assignment may be automatically done as follows. In the first example, for example, when the communication is established via the transmission channel 100, the channel order of the radio control transmitter for the trainee 1B is transmitted from the radio control transmitter for the trainee 1B to the radio control transmitter for the trainer 1A via the transmission channel 100. The radio control transmitter for the trainer 1A assigns the channel of the radio control transmitter for the trainee 1B to the channel of the radio control transmitter for the trainer 1A associated with the same controlled object using the received channel order. Then, according to the channel assignment result, the channel corresponding table 27c is generated and stored in the memory 22a. In the second example, the channel order of the radio control transmitter for the trainer 1A is transmitted from the radio control transmitter for the trainer 1A to the radio control transmitter for the trainee 1B. The radio control transmitter for the trainee 1B assigns the channel of the radio control transmitter for the trainer 1A to the channel of the radio control transmitter for the trainee 1B associated with the same controlled object using the received channel order. Then, according to the channel assignment result, the channel corresponding table 27e is generated and stored in the memory 22b.

Further, in the above explanation, the PPM signal or the configuration shown in FIG. 13 are used as the signal format. However, the present invention is not limited to these. Other signal format can be used as long as the control amount data of each channel can be assigned.

Further, in the above explanation, the steered object is a flying object. In reality, the trainer function is much needed when the steered object is a flying object. However, this embodiment can be used in the steered objects other than the flying object (for example, a model car, a model ship or the like).

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A radio control transmitter comprising:
    a receiving device configured to receive an indirect steering signal assigned to operational data of an controlled object in each channel according to a channel order which is set, said indirect steering signal being sent by an external radio control transmitter, and said indirect steering signal having the channel order which is set, said channel order associating a channel with a controlled object;
    a channel assignment data holding device configured to hold channel assignment data which assigns the channels of a present radio control transmitter to the channels of the external radio control transmitter which are associated with the same controlled objects under the above channel order;
    a channel converting device configured to convert the channels of the present radio control transmitter to the channels of the external radio control transmitter corresponding to the operational data in the channel assignment data in each operational data of the received indirect steering signal;
    a direct steering signal generating device configured to receive the operational data in which at least the channels of the present radio control transmitter are assigned by the channel converting device, being configured to store the received operational data as data of the channels which are assigned, and being configured to generate a direct steering signal, the direct steering signal generating device adding steering related data to the operational data including one of the channel assignment setting of the present radio control transmitter by the steering operation corresponding device and the operational data including the channel assignment setting by the channel converting device;

a steering operation corresponding device configured to output an operational data including a channel assignment setting according to the channel order of the present radio control transmitter corresponding to a steering operation on the present radio control transmitter; and a selecting device configured to select any one of the operational data including the channel assignment setting of the present radio control transmitter by the steering operation corresponding device, and the operational data including the channel assignment setting by the channel converting device, and configured to send the selected operational data to the direct steering signal generating device, wherein the channel assignment setting is automatically done by the steps of:

transmitting the channel order of the radio control transmitter for the present radio control transmitter from the radio control transmitter for the present radio controller transmitter to the radio control transmitter for the external radio control transmitter via a transmission channel after communication is established via the transmission channel;

converting the channel of the radio control transmitter for the present radio controller transmitter to the channel of the radio control transmitter for the external radio controller transmitter associated with the same control object using the received channel order; and then generating and storing a channel corresponding table in a memory according to a channel assignment result.

2. The radio control transmitter as claimed in claim 1, further comprising:

an operation input device configured to input an operation of assigning a channel of an external radio control transmitter associated with the same controlled object according to the channel order to each of channels of the present radio control transmitter; and a channel assignment data generating device configured to generate a channel assignment data based on an input result of the operation input device.

3. A radio control transmitter comprising:

a receiving device configured to receive an indirect steering signal assigned to operational data of an controlled object in each channel according to a channel order which is set, said indirect steering signal being sent by an external radio control transmitter, and said indirect steering signal having the channel order which is set, said channel order associating a channel with a controlled object;

a channel assignment data holding device configured to hold channel assignment data which assigns the channels of a present radio control transmitter to the channels of the external radio control transmitter which are associated with the same controlled objects under the above channel order;

a channel converting device configured to convert the channels of the present radio control transmitter to the channels of the external radio control transmitter corresponding to the operational data in the channel assignment data in each operational data of the received indirect steering signal;

a direct steering signal generating device configured to receive the operational data in which at least the channels of the present radio control transmitter are assigned by the channel converting device, being configured to store the received operational data as data of the channels which are assigned, and being configured to generate a direct steering signal;

a steering operation corresponding device configured to output an operational data including a channel assignment setting according to the channel order of the present radio control transmitter corresponding to a steering operation on the present radio control transmitter; and a combining device configured to combine the operational data including the channel assignment setting of the present radio control transmitter by the steering operation corresponding device, and the operational data including the channel assignment setting by the channel converting device in each of the same channel, and configured to send the combined data to the direct steering signal generating device, wherein the direct steering signal generating device adds steering related data to the operational data including the channel assignment setting of the present radio control transmitter by the steering operation corresponding device, and the operational data including the channel assignment setting by the channel converting device combined in each of the same channel by the combining device, and wherein the channel assignment setting is automatically done by the steps of:

transmitting the channel order of the radio control transmitter for the present radio controller transmitter from the radio control transmitter for the present radio controller transmitter to the radio control transmitter for the external radio controller transmitter via a transmission channel after communication is established via the transmission channel;

converting the channel of the radio control transmitter for the present radio controller transmitter to the channel of the radio control transmitter for the external radio controller transmitter associated with the same control object using the received channel order; and then generating and storing a channel corresponding table in a memory according to a channel assignment result.

4. The radio control transmitter as claimed in claim 3, further comprising:

an operation input device configured to input an operation of assigning a channel of an external radio control transmitter associated with the same controlled object according to the channel order to each of channels of the present radio control transmitter; and a channel assignment data generating device configured to generate channel assignment data based on an input result of the operation input device.

* * * * *